US012792320B2

(12) United States Patent
Hurley et al.

(10) Patent No.: US 12,792,320 B2
(45) Date of Patent: Nov. 10, 2026

(54) EMBEDDED USER INTERFACE ELEMENTS

(71) Applicant: Stripe, LLC, South San Francisco, CA (US)

(72) Inventors: Gabriel Hurley, Oakland, CA (US); Julia Chaves, Oakland, CA (US); Peter Yaworski, Aurora (CA); Fred Kuo, Seattle, WA (US); Konstantin Tennhard, Pointe-Claire (CA); Jorge Eugenio Aguirre Gonzalez, Bothell, WA (US)

(73) Assignee: Stripe, LLC, South San Francisco, CA (US)

( * ) Notice: Subject to any disclaimer, the term of this patent is extended or adjusted under 35 U.S.C. 154(b) by 215 days.

(21) Appl. No.: 18/751,155

(22) Filed: Jun. 21, 2024

(65) Prior Publication Data

US 2024/0346105 A1 Oct. 17, 2024

Related U.S. Application Data

(63) Continuation-in-part of application No. 18/086,631, filed on Dec. 21, 2022, now Pat. No. 12,079,604.

(51) Int. Cl.

| | |
|---|---|
| ***G06F 8/38*** | (2018.01) |
| ***G06F 3/0482*** | (2013.01) |
| ***G06F 9/451*** | (2018.01) |
| ***G06F 16/957*** | (2019.01) |
| ***G06F 16/958*** | (2019.01) |
| ***G06F 21/60*** | (2013.01) |
| ***G06F 40/143*** | (2020.01) |

(52) U.S. Cl.

CPC .............. *G06F 8/38* (2013.01); *G06F 3/0482* (2013.01); *G06F 9/451* (2018.02); *G06F 16/9577* (2019.01); *G06F 16/958* (2019.01); *G06F 16/986* (2019.01); *G06F 21/604* (2013.01); *G06F 40/143* (2020.01); *G06F 2221/2149* (2013.01)

(58) Field of Classification Search

None

See application file for complete search history.

(56) References Cited

U.S. PATENT DOCUMENTS

| | | | | |
|---|---|---|---|---|
| 6,801,224 | B1 | 10/2004 | Lewallen | |
| 10,635,746 | B2 | 4/2020 | Kong et al. | |
| 2013/0159890 | A1 | 6/2013 | Rossi | |
| 2019/0068723 | A1* | 2/2019 | Drasin | H04L 67/02 |
| 2019/0302981 | A1* | 10/2019 | Storr | G06F 3/0486 |
| 2021/0248205 | A1 | 8/2021 | Tank | |
| 2023/0153895 | A1 | 5/2023 | Marla | |
| 2023/0186376 | A1 | 6/2023 | Ortiz | |

* cited by examiner

*Primary Examiner* — Qing Chen

(74) *Attorney, Agent, or Firm* — BAKERHOSTETLER

(57) ABSTRACT

In some embodiments, an electronic device is configured to transmit a first request for an account session key, receive the account session key associated with a first set of permissions corresponding to the embedded interface element and a second set of permissions corresponding to the embedded app, transmit a second request for an embedded app key, receive the embedded app key associated with a third set of permissions corresponding to the embedded app, and proxy communications between the embedded interface element and the processor server, based on the account session key associated with the first set of permissions, and between the embedded app and the processor server, based on the embedded app key associated with the third set of permissions.

20 Claims, 9 Drawing Sheets

EMBEDDED USER INTERFACE ELEMENTS

CROSS-REFERENCE TO RELATED APPLICATIONS

The present application is a continuation-in-part of U.S. patent application Ser. No. 18/086,631 (now issued as U.S. Pat. No. 12,079,604), entitled "EMBEDDED USER INTERFACE ELEMENTS," filed on Dec. 21, 2022, which is hereby incorporated herein by reference in its entirety and made part of the present U.S. Utility Patent Application for all purposes.

TECHNICAL FIELD

The disclosure generally relates to software application development, and in particular embedded user interface elements.

BACKGROUND

When deploying a webpage or application, software developers commonly integrate components that are sourced from a third-party developer. For example, a software developer can integrate a component, built by a third-party developer, for accepting payments into a webpage that offers goods for purchase. The payment acceptance component can, in some embodiments, allow entry of payment information and facilitate the authorization and exchange of funds. Such integrated third-party components can allow the software developer to deploy their functioning webpage without having to build their own components (e.g., a component for payment flow handling and/or accepting payments). These third-party, embedded components can have user interface elements that are added to the webpage for interaction with an end user.

SUMMARY

Some techniques for embedding a user interface (UI) element developed by a third-party can be cumbersome, time consuming, and/or inefficient due to the amount of work required by a software developer who is attempting to integrate the UI element into a webpage (and/or an application). This work might be required to ensure, amongst other reasons, that (1) the component functions as intended, (2) the component displays correctly with the other webpage content, and (3) the appropriate security and permissions associated with the webpage and the component are maintained. With respect to functioning as intended, the software developer may need to ensure that an embedded UI element has access to the data that the embedded UI element needs to function properly, including any necessary authentication and/or permissions requirements. With respect to displaying correctly, the software developer may need to ensure that the embedded UI element displays correctly and that the webpage as a whole, including non-embedded UI elements, displays correctly after the embedded UI element is integrated into the webpage. With respect to data security, the developer may need to ensure that the embedded UI element can be configured with the proper permissions for functioning correctly without sacrificing the security of the webpage.

This disclosure provides an embedded user interface element that can add functionality to a webpage or application, have a user interface appearance that is independent of the platform user interface, and be subject to authentication and permissions-based restrictions on access to user data hosted by a third-party entity.

In some embodiments, a method that is performed by a computer system is described. In some embodiments, the method comprises: receiving a request to render components of a webpage, wherein the webpage includes a platform, a platform user interface (UI), one or more embedded UI elements, and an inline frame element; in response to receiving the request, causing the platform to load a script element that creates the inline frame element and receives a secret token; authenticating an embedded session within the platform using the secret token; in response to authenticating the embedded session, generating an application programming interface (API) key, wherein the API key is used by the inline frame element to authenticate API requests to a resource associated with a third-party; receiving, via the inline frame element, data corresponding to the one or more embedded UI elements from the resource associated with a third-party, wherein the inline frame element is a proxy between the platform and the resource associated with a third-party; rendering the one or more embedded UI elements in a shadow document object model (DOM) based on the data corresponding to the one or more embedded UI elements received from the inline frame element, wherein the inline frame element does not render a UI; and causing display of the one or more embedded UI elements in the platform UI on the webpage.

In some embodiments, a non-transitory computer-readable storage medium storing one or more programs configured to be executed by one or more processors of a computer system is described. In some embodiments, the one or more programs includes instructions for: receiving a request to render components of a webpage, wherein the webpage includes a platform, a platform user interface (UI), one or more embedded UI elements, and an inline frame element; in response to receiving the request, causing the platform to load a script element that creates the inline frame element and receives a secret token; authenticating an embedded session within the platform using the secret token; in response to authenticating the embedded session, generating an application programming interface (API) key, wherein the API key is used by the inline frame element to authenticate API requests to a resource associated with a third-party; receiving, via the inline frame element, data corresponding to the one or more embedded UI elements from the resource associated with a third-party, wherein the inline frame element is a proxy between the platform and the resource associated with a third-party; rendering the one or more embedded UI elements in a shadow document object model (DOM) based on the data corresponding to the one or more embedded UI elements received from the inline frame element, wherein the inline frame element does not render a UI; and causing display of the one or more embedded UI elements in the platform UI on the webpage.

In some embodiments, a transitory computer-readable storage medium storing one or more programs configured to be executed by one or more processors of a computer system is described. In some embodiments, the one or more programs includes instructions for: receiving a request to render components of a webpage, wherein the webpage includes a platform, a platform user interface (UI), one or more embedded UI elements, and an inline frame element; in response to receiving the request, causing the platform to load a script element that creates the inline frame element and receives a secret token; authenticating an embedded session within the platform using the secret token; in response to authenticating the embedded session, generating an application programming interface (API) key, wherein the API key is used by the inline frame element to authenticate API requests to a resource associated with a third-party; receiving, via the inline frame element, data corresponding to the one or more embedded UI elements from the resource associated with a third-party, wherein the inline frame element is a proxy between the platform and the resource associated with a third-party; rendering the one or more embedded UI elements in a shadow document object model (DOM) based on the data corresponding to the one or more embedded UI elements received from the inline frame element, wherein the inline frame element does not render a UI; and causing display of the one or more embedded UI elements in the platform UI on the webpage.

In some embodiments, a computer system is described. In some embodiments, the computer system comprises one or more processors and memory storing one or more program configured to be executed by the one or more processors. In some embodiments, the one or more programs includes instructions for: receiving a request to render components of a webpage, wherein the webpage includes a platform, a platform user interface (UI), one or more embedded UI elements, and an inline frame element; in response to receiving the request, causing the platform to load a script element that creates the inline frame element and receives a secret token; authenticating an embedded session within the platform using the secret token; in response to authenticating the embedded session, generating an application programming interface (API) key, wherein the API key is used by the inline frame element to authenticate API requests to a resource associated with a third-party; receiving, via the inline frame element, data corresponding to the one or more embedded UI elements from the resource associated with a third-party, wherein the inline frame element is a proxy between the platform and the resource associated with a third-party; rendering the one or more embedded UI elements in a shadow document object model (DOM) based on the data corresponding to the one or more embedded UI elements received from the inline frame element, wherein the inline frame element does not render a UI; and causing display of the one or more embedded UI elements in the platform UI on the webpage.

In some embodiments, a computer system is described. In some embodiments, the computer system includes: means for receiving a request to render components of a webpage, wherein the webpage includes a platform, a platform user interface (UI), one or more embedded UI elements, and an inline frame element; means for, responsive to receiving the request, causing the platform to load a script element that creates the inline frame element and receives a secret token; means for authenticating an embedded session within the platform using the secret token; means for, responsive to authenticating the embedded session, generating an application programming interface (API) key, wherein the API key is used by the inline frame element to authenticate API requests to a resource associated with a third-party; means for receiving, via the inline frame element, data corresponding to the one or more embedded UI elements from the resource associated with a third-party, wherein the inline frame element is a proxy between the platform and the resource associated with a third-party; means for rendering the one or more embedded UI elements in a shadow document object model (DOM) based on the data corresponding to the one or more embedded UI elements received from the inline frame element, wherein the inline frame element does not render a UI; and means for causing display of the one or more embedded UI elements in the platform UI on the webpage.

In some embodiments, a computer program product is described. In some embodiments, the computer program product comprises one or more programs configured to be executed by one or more processors of a computer system. In some embodiments, the one or more programs includes instructions for: receiving a request to render components of a webpage, wherein the webpage includes a platform, a platform user interface (UI), one or more embedded UI elements, and an inline frame element; in response to receiving the request, causing the platform to load a script element that creates the inline frame element and receives a secret token; authenticating an embedded session within the platform using the secret token; in response to authenticating the embedded session, generating an application programming interface (API) key, wherein the API key is used by the inline frame element to authenticate API requests to a resource associated with a third-party; receiving, via the inline frame element, data corresponding to the one or more embedded UI elements from the resource associated with a third-party, wherein the inline frame element is a proxy between the platform and the resource associated with a third-party; rendering the one or more embedded UI elements in a shadow document object model (DOM) based on the data corresponding to the one or more embedded UI elements received from the inline frame element, wherein the inline frame element does not render a UI; and causing display of the one or more embedded UI elements in the platform UI on the webpage.

Executable instructions for performing these functions are, optionally, included in a non-transitory computer-readable storage medium or other computer program product configured for execution by one or more processors. Moreover, details of one or more examples, implementations, and/or embodiments are set forth in the accompanying drawings and the description below. Other components, features, aspects, and potential advantages will be apparent from the description and drawings, and from the claims.

BRIEF DESCRIPTION OF THE FIGURES

For a better understanding of the various described embodiments, reference should be made to the Detailed Description below in conjunction with the following figures in which like reference numerals refer to corresponding parts throughout the figures.

DETAILED DESCRIPTION

Businesses today rely on software tools to run aspects of their operations. These software tools can be accessed by an end user device via a webpage or web-connected application. For example, an end user device can interface with a software tool via a webpage managed (e.g., hosted, maintained) by a third-party service provider. The webpage can include one or more user interface elements/components that correspond to functions and services. For example, a dashboard webpage can include multiple user interface elements that each relate to a different function associated with managing a business. For instance, one such element can display a customer transactions list (e.g., purchases from the business), another element can display a summary of merchandise inventory, and another element can display a summary of accounting information (e.g., accounts receivable and payable). These functions and associated user interface elements can either be built by the webpage service provider's developers or be sourced from other third-party developers and embedded into the dashboard webpage. Embedding existing user interface elements and functionality from other third-party developers can reduce development time and resources needed by a third-party service provider.

Thus, there is a need for the ability to integrate functionality and associated UI element(s) from third-party developers into webpages. The functions and embedded UI elements are preferably integrated so that the embedded UI element is visually integrated into the platform webpage (e.g., such that the embedded UI element shares one or more characteristics of the webpage into which the embedded UI element is integrated). These embedded UI elements can be developed and published by their respective third-party developers for integration into a compatible webpage. Therefore, one or more aspects of the visual appearance of the embedded UI element are preferably isolated from being impacted by visual style templates (e.g., fonts, spacing, color, and/or other visual characteristics that can be defined via cascading style sheets) associated with the webpage. Further, to the extent that the embedded UI element relies on data that is subject to security or permissions-related restrictions for accessing needed data, the embedded UI element and associated programming preferably provides mechanisms that are compatible with such restrictions.

With the above framework in mind, attention is now turned to techniques for providing webpages (and/or applications) with embedded UI elements.

Figure 1:
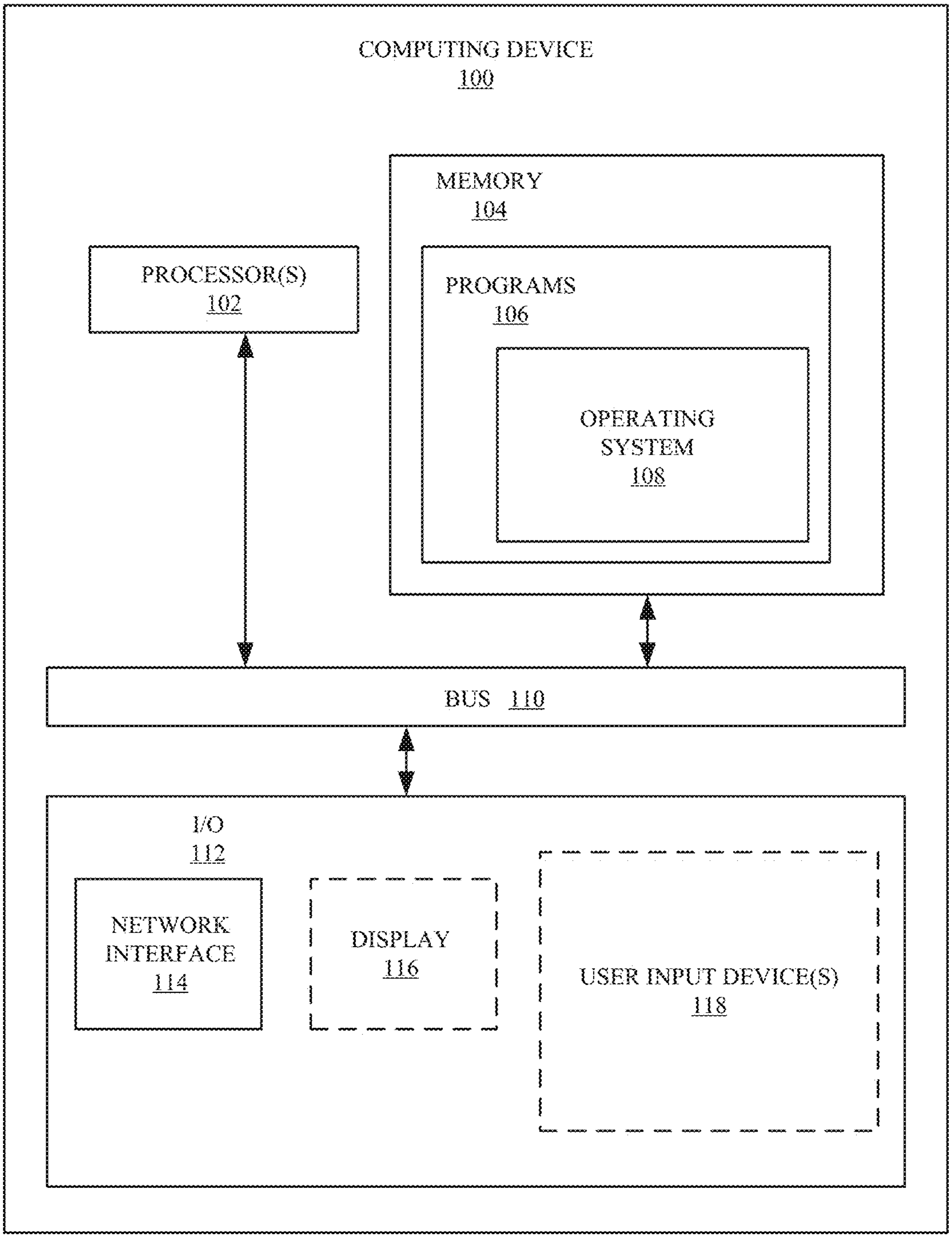
FIG. 1 illustrates a block diagram of a computing device that implements one or more processes in accordance with one or more embodiments described herein.

FIG. 1 illustrates an example computing device 100 (alternatively referred to as computing device 100, computer system 100, system 100, and/or electronic device 100) that can be used to support and/or implement the architecture and operations in accordance with one or more embodiments described herein. It will be apparent to those of ordinary skill in the art, however, that other alternative systems of various system architectures can also be used. For example, the other alternative systems can be a computing system with fewer, different, and/or additional components than those illustrated in (and/or described in relation to) FIG. 1 or a computing system including one or more computing devices 100 as illustrated in FIG. 1. In some embodiments, computing device 100 is a general-purpose computer. In some embodiments, computing device 100 is a special purpose (e.g., application specific) hardware device.

Computing device 100 illustrated in FIG. 1 includes one or more bus (or other internal communication component) 110 for communicating information and one or more processors 102 coupled to the bus 110 for processing information. Computing device 100 includes memory 104 coupled to bus 110. Memory 104 can include random access memory (RAM) or other volatile storage device for storing information and instructions to be executed by one or more processors 102 and/or for storing temporary variables or other intermediate information during execution of instructions by one or more processors 102. Memory 104 can also include non-volatile memory storage, such as read-only memory (ROM) and/or a static storage device for storing static information and instructions executable by processors 102, and one or more data storage devices such as a hard disk (e.g., magnetic disk), flash memory storage, or optical disk and its corresponding disk drive. This data storage device can be coupled to bus 110 for storing information and instructions. For example, memory 104 can store programs 106 in non-volatile memory. In some embodiments, the programs include one or more sets of computer-executable instructions for execution by the one or more processors 102. When ready for execution, the instructions are loaded into volatile memory and passed the processors for execution. The programs 106 can include an operating system 108 for managing the computing device's basic functionality, such as scheduling tasks, executing applications, and controlling peripheral devices. As used herein, the term "program" or "computer program" are considered synonymous with "application," "computer application," or "application component" unless otherwise stated in the context in which the term is used.

Computing device 100 can also include one or more input/output (I/O) components 112. FIG. 1 illustrates several example I/O components grouped together within I/O components 112 for illustration purposes only, and each such component therein does not necessarily need to be located together, or within a part of computing device 100. For example, an I/O component 112 can be an external device coupled to an interface of computing device 100. Computing device 100 can include network interface 114 for handling uplink and/or downlink communications with one or more other devices. The network interface 114 can itself be a communication device and can include any of a number of commercially available networking peripheral devices such as those used for coupling to an Ethernet connection, Wi-Fi connection, 3GPP mobile communication protocol (e.g., 3G, 4G, LTE, 5G, NR, and/or the like), and/or the like, to communicate over the Internet, a wide area network, a local area network, an ad-hoc (device-to-device network), or the like. Network interface 114 can be a modem connection, and/or any other mechanism that provides connectivity between the computing device 100 and one or more other devices. Note that one or more of the components of this system illustrated in FIG. 1 and associated hardware can be used in various embodiments as discussed herein.

Computing device 100 can optionally be coupled to display device 116, such as a light emitting diode (LED) display or a liquid crystal display (LCD) (e.g., coupled through bus 110 for displaying information to a user of computing device 100). Display device 116 can be integrated into computing device 100 (e.g., a touchscreen of a smartphone) or be external to computing device 100 (e.g., an external display coupled via a cable with computing device 100).

Computing device 100 can optionally include one or more user input device(s) 118, such as an alphanumeric input device (e.g., keyboard), a cursor control or other input signaling device (e.g., a touch-sensitive display (touchscreen), a touchpad, mouse, a trackball, stylus, or cursor direction keys) for controlling cursor movement and/or selection on a user interface displayed using display device 116.

In some embodiments, computing device 100 is a server or system of servers. For example, the server can be a collection of one or more computer hardware machines working together to perform processes and tasks described with respect to computing device 100. Thus, computing device 100 can be considered a logical construct, and references thereto can and should be interpreted as encompassing scope that includes computing device 100 being comprised of one or more computing devices (e.g., as computing device 100 is described) or several devices that together behave as computing device 100 has been described. As one of skill would appreciate, there is no requirement express or implied herein that the components of computing device 100 be dedicated or physical resources, or that the components must be located physically together. Rather, computing device 100 can be embodied in one or more virtual machines and/or certain functional components of computing device 100 can be remote from other functional components of computing device 100.

Figure 2:
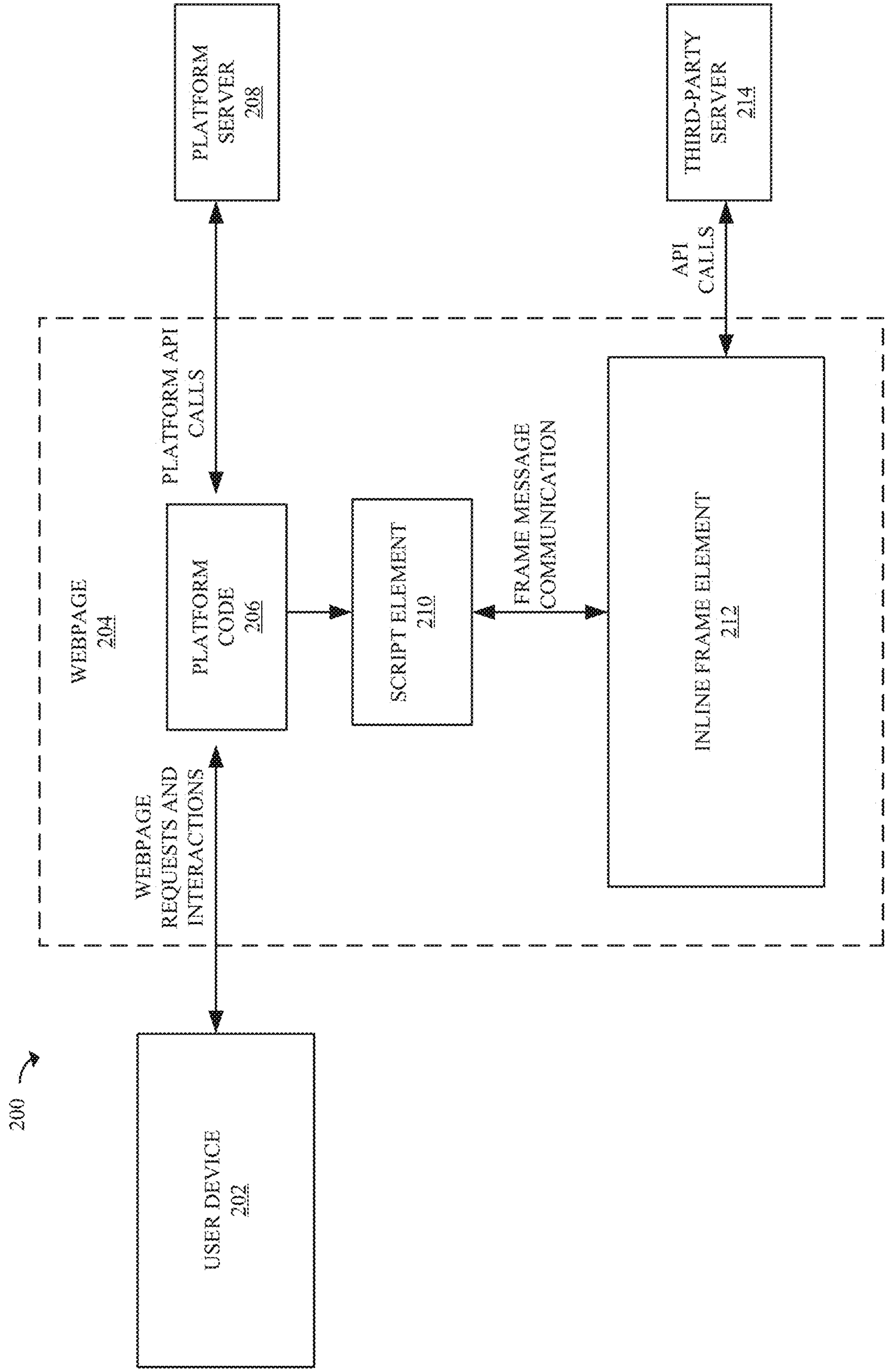
FIG. 2 illustrates an exemplary block diagram of a system for deploying embedded user interface elements in accordance with one or more embodiments described herein.

FIG. 2 illustrates an exemplary block diagram 200 of system for deploying embedded user interface elements in accordance with one or more embodiments described herein. FIG. 2 provides an exemplary scenario to explain one or more technical details of this disclosure. However, other examples could be contemplated to explain the one or more technical details of this disclosure, and the one or more technical details of this disclosure is not limited to the example discussed in relation to FIG. 2. User device 202, server 208, and third-party server 214 can include one or more features of computing device 100.

The example scenario shown in FIG. 2 corresponds to user device 202 (e.g., computing device 100) accessing a webpage that includes an embedded UI element provided by third-party server 214 (e.g., a server associated with a third party that is separate from server 208). In this example, user device 202 is associated with (e.g., logged into) a user account associated with webpage 204 (e.g., associated with and/or belonging to a manager of the webpage) and also associated with (e.g., logged into) a user account associated with a third-party server 214 (e.g., a third-party developer's service). The embedded UI element is created by a third-party developer that is different than a developer of server 208. While the example here refers to a webpage, it is equally applicable to an application (e.g., an application that is connected to the Internet).

With respect to FIG. 2, webpage 204 and server 208 are associated with a business services provider, and the webpage 204 is a webpage for subscribers of the business services provider to track business records and customer relationships. The service provider of webpage 204 integrates an embedded UI element that was created and developed by a third-party developer's platform. This embedded UI element is associated with one or more functions or services provided by the third-party developer platform. In this example, the third-party developer platform maintains business records (e.g., customer transactions) for the user account associated with user device 202.

In one example, the service provider integrates the embedded UI element from the third-party developer into webpage 204 to include a customer transaction tracking tool that accesses the subscriber's business transaction data, prints it to a screen, and allows interaction with the transaction data. Using the embedded UI element from the third-party developer reduces the amount of time that it takes to develop the frontend and/or backend components needed to provide users with the customer transaction tracking tool within webpage 204. Block diagram 200 illustrates at a high level the various components and interactions that occur when deploying an embedded UI element in accordance with one or more embodiments.

User device 202 requests webpage 204 via server 208 (which can include one or more servers). A webpage is a markup document to be displayed by a web browser (e.g., of user device 202). In some embodiments, the webpage is written in HTML. In response to receiving the request, one or more server 208 provides webpage 204 (including platform code 206) to user device 202. For example, providing webpage 204 can include providing a markup document (e.g., HTML document) to user device 202. Platform code 206 can include documents, code, links, styles, user interface elements, and/or other assets associated with a web platform used (e.g., offered) by the webpage 204. The platform code 206 can also include embedded UI elements (e.g., developed by third-party developers and hosted by a trusted third-party). In the example in FIG. 2, the webpage 204 includes its own UI elements (referred to as platform UI elements), as well as a third-party UI element (referred as an embedded UI element). In this embodiment, platform code 206 includes a script element 210 that is executed to create inline frame element 212 (sometimes referred to as an iframe). In some embodiments, the inline frame element is an invisible inline frame that includes no UI components that render to the webpage. This inline frame element 212 is used as a proxy for communication between the webpage platform (e.g., platform code 206) and third-party server 214. In some examples, third-party server 214 is managed by the trusted third-party developer. Communication between the third-party server 214 and platform code 206 can be performed via an API with third-party server 214. In some embodiments, the platform makes an API call via the inline frame element with an account identification of the connected end user (e.g., of user device 202). In some embodiments, the script element creates a secret token (e.g., a signed authentication token, or the like). In some embodiments, the secret token is used to authenticate a session with the third-party server. In some embodiments, this authentication is used to authenticate future API calls and/or is used by third-party server 214 to enforce permissions. For example, a customer transaction user interface element embedded into the webpage may only have permission to view transactions (no permission to edit) and lack permission to view other data associated with the subscriber (e.g., no permission to view inventory). A secret token can uniquely identify an account or service associated with the session such that permissions associated with that account or service can be enforced.

As can be seen, FIG. 2 provides a basic framework of the architecture and communications for deploying an embedded UI element within a webpage or application. An embedded user interface element as described herein can be simple or complex. In some embodiments, an embedded UI element is an experience-type element (e.g., a large embedded element where several user interface interactions are enabled by the single large embedded element). In some embodiments, an embedded UI element is a feature-type element (e.g., an element corresponding to a discrete task or function (e.g., a transaction list, dispute processing)).

In some embodiments, experience-type UI elements are the primary focus of a page. For example, an experience-type UI element enables a subaccount (e.g., an end user account) to accomplish a set of tasks around a specific need. For example, an application management experience can allow a user to understand and perform actions to manage applications, by letting them find how much memory is being used by a particular application, download and/or update an application, see application details, etc. In some embodiments, an experience-type element includes transactional and informational functionality (both read/write as well as read-only functions). Experience-type elements can be useful in the following scenarios: when a webpage needs certain services to support another feature (e.g., a business needs a payment feature to support tipping), for webpage platforms with limited engineering resources, and for webpage that want to quickly deploy or test an idea or feature.

In some embodiments, feature-type UI elements are more discrete in nature than experience-type UI elements. For example, a discrete function is accomplished as an embedded UI element and can stand alone as a feature-type UI element or be included as one function of many in an experience-type UI element. For example, a transaction dispute function will live in a transactions list experience-type element but can also be a standalone feature-type UI element. Feature-type UI elements can be useful in the following scenarios: when a service provider that manages webpage wants to layer complex services on top of pre-built foundations, and when a service provider lacks the engineering resources to build time consuming and complex financial services functionality but wants more UI control than experience-type UI elements offer.

Figure 3:
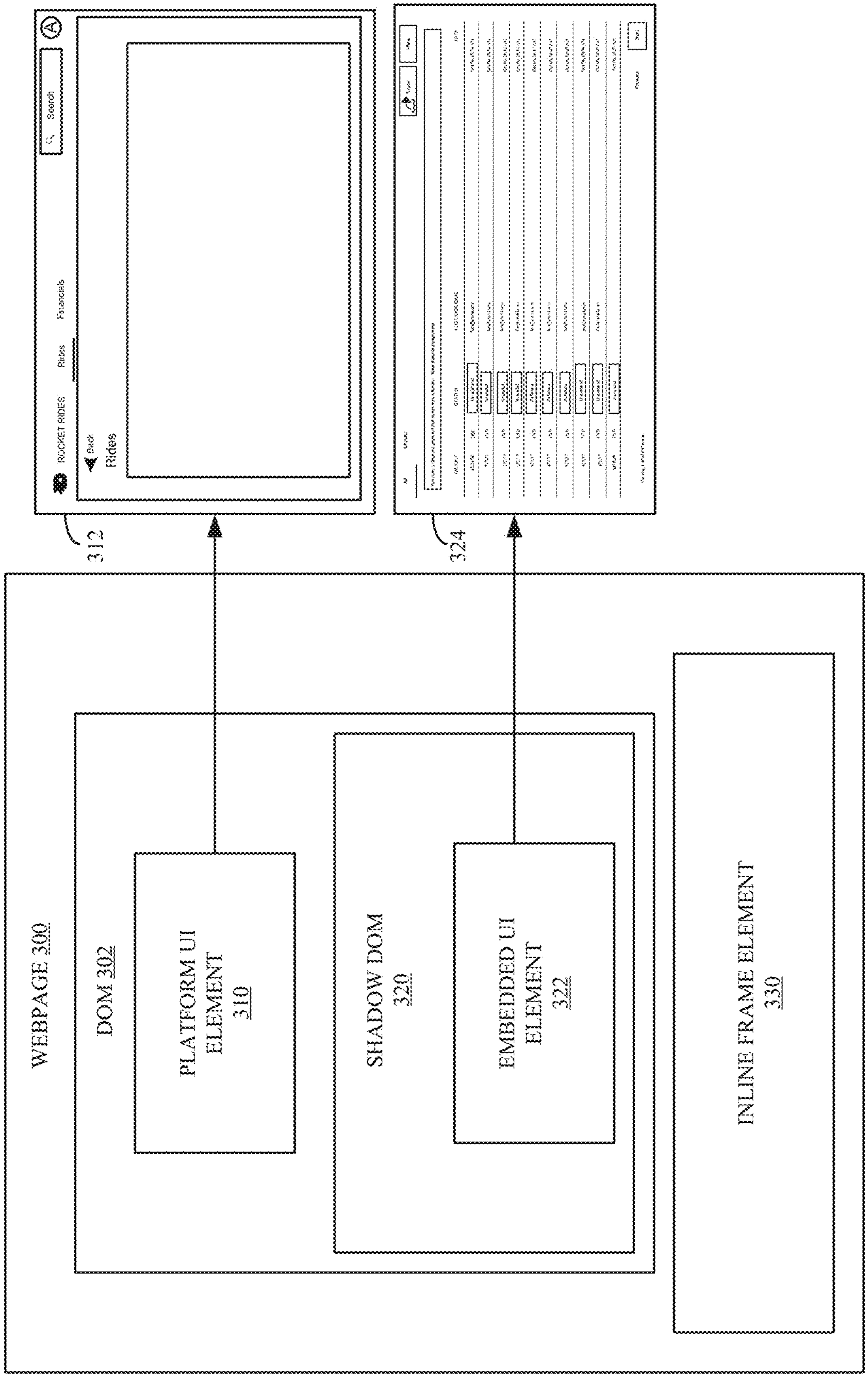
FIG. 3 illustrates an exemplary block diagram of webpage elements in accordance with one or more embodiments described herein.

FIG. 3 illustrates diagram 300 depicting blocks that represent exemplary elements of a webpage described herein in accordance with one or more embodiments described herein. FIG. 3 provides an exemplary scenario to explain one or more technical details of this disclosure; however, other examples could be contemplated to explain the one or more technical details of this disclosure, and the one or more technical details of this disclosure is not limited to the example discussed in relation to FIG. 3.

In some embodiments, a platform UI element is rendered using a document object model (DOM). In some embodiments, an embedded UI element is rendered using a shadow document object model (shadow DOM). A DOM (also referred to as a light DOM) is a representation of a webpage structure in the form of a tree, in which each element of a page is a node of the tree. The DOM is assembled by a web browser from a markup document (e.g., HTML document) of the webpage. A shadow DOM is an encapsulation technique that allows a developer to attach a "hidden" DOM tree (or trees) to an element of the DOM. The shadow DOM can include its own tree structure and styles. Encapsulation is achieved because the style of the element of the DOM does not affect the style of a custom component defined by the shadow DOM, and the shadow DOM does not affect styles of elements outside of the shadow DOM.

FIG. 3 illustrates a webpage that includes platform UI element 310, which is generated based on the webpage code that originates from the service provider's resource (e.g., server). DOM 302 is used to render platform UI element 310. Rendered platform UI element 312 depicts platform UI element 310 as it appears after being rendered (using DOM 302) and displayed (e.g., such as at user device 202). As shown, rendered platform UI element 312 includes branding associated with the webpage manager ("Rocket Rides") and some selectable options associated with the webpage (tabs for "Rides" and "Financials", and a search bar). As shown in FIG. 3, platform UI element 312 includes a blank area with no content, where an embedded UI element (e.g., 324) appears once the webpage is fully rendered.

FIG. 3 also illustrates shadow DOM 320. Shadow DOM 320 is used to render embedded UI element 322 as part of the embedded component <third-party-payments-experience>. Rendered embedded UI element 324 represents embedded UI element 322 after rendering by shadow DOM 320 and displayed. Rendered embedded UI element 324 shows a payment transaction list. The payment transaction list includes data accessed via inline frame element 330 acting as a proxy between the webpage and a third-party server that controls access to and provides such data. FIG. 3 also shows inline frame element 330, which has no rendered UI components. In some embodiments, inline frame element 330 has no rendered UI components defined within inline frame element 330 (e.g., within the markup (e.g., HTML markup) that is originally delivered to the system hosting the webpage). In some embodiments, inline frame element 330 has one or more UI components that are rendered. For example, the inline frame element 330 can cause a small number or amount of UI to be rendered.

The use of a shadow DOM as described above can help achieve the modularity and portability of the embedded UI elements, allowing them to be placed in many different types of service providers' webpages without being adversely affected in appearance by platform-specific or implementation-specific settings. In some embodiments, there is one shadow DOM per embedded UI element. In some embodiments, a purpose of the shadow DOM is to provide style isolation between the UI rendered by embedded UI elements and platform UI elements. In some embodiments, the shadow DOM can ensure that the styles of the service provider webpage (e.g., as defined by a DOM (e.g., non-shadow DOM) of the webpage) do not affect embedded UI element styles (e.g., established by the third-party developer platform). In some embodiments, the shadow DOM ensures also that embedded UI elements styles do not affect the service provider's UI styles. Rather the style and appearance of the embedded UI elements can be a function of data received from a server that serves the webpage via the inline frame element.

By using a shadow DOM to render embedded UI elements and not rendering the associated UI in the inline frame element (e.g., iframe), one or more benefits can result. In some embodiments, embedded UI elements can be configured to optionally directly use/inherit custom fonts defined by the webpage. Because the embedded UI element is included in the markup document, such custom fonts can be directly inherited. This stands in contrast to needing to inject via a font URL to an iframe for a UI element rendered from the iframe. Thus, encapsulation can be achieved, while maintaining the option to coordinate style(s) with the platform UI. In some embodiments, there is no need for iframe size listeners to resize embedded UI elements. Standing in contrast to rendering all embedded UI through an iframe, the embedded UI elements rendered with a shadow DOM can resize (e.g., due to user interaction) just like any other platform UI element would according to styling rules set by the webpage. In some embodiments, the latency for loading initial UI can be faster. For example, as compared to rendering UI through an iframe, there is no need to load a separate HTML page for the embedded UI elements to render, thus possibly reducing latency.

Notably, iframes can be difficult to deploy in a way that maintains an acceptable user experience across implementations and/or user interactions. The techniques described herein can achieve the benefits of using iframes as a data transfer layer without certain downsides of using iframes for rendering UI. Thus, style isolation benefits can be achieved while avoiding such downsides.

Figure 4:
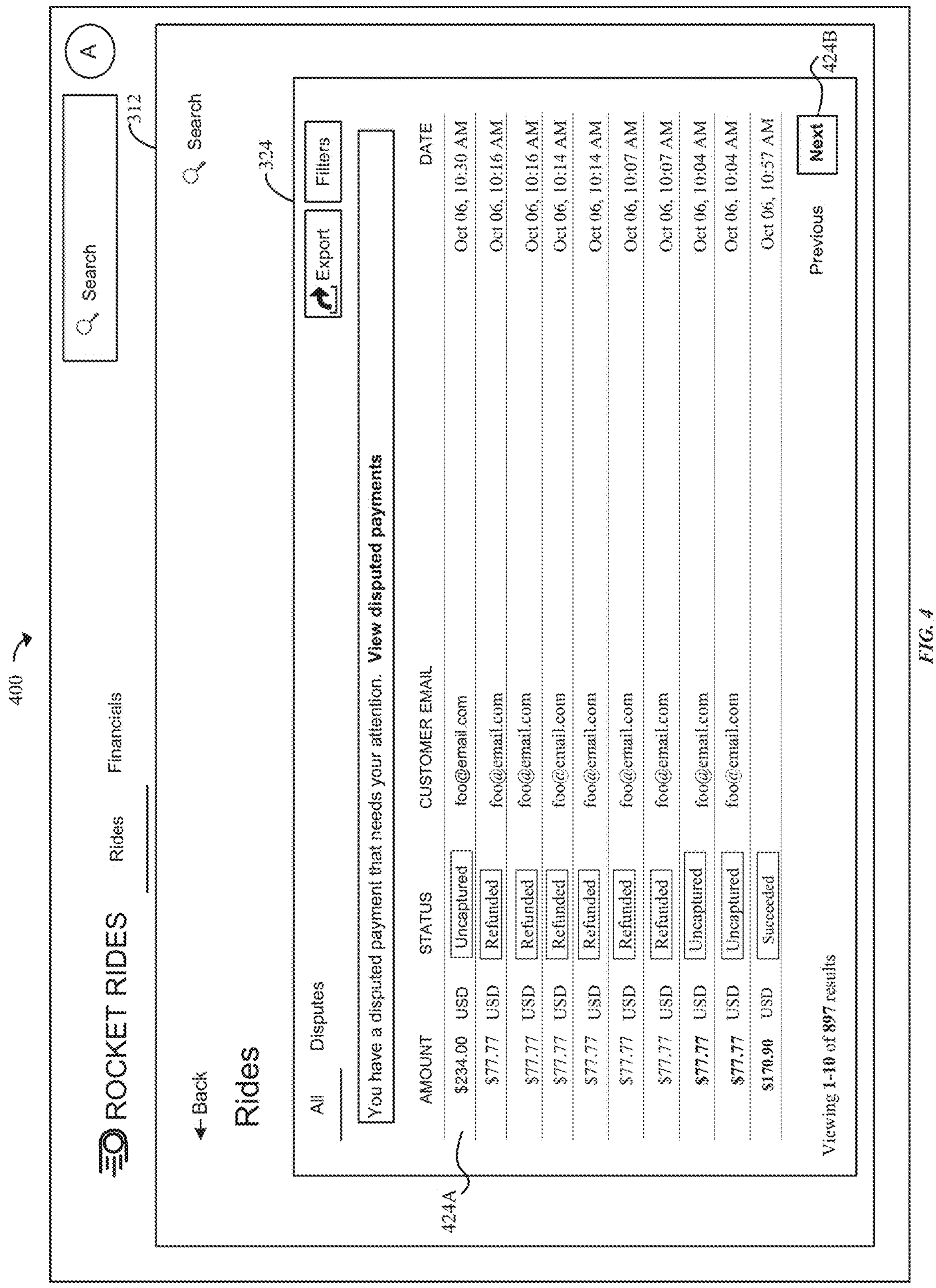
FIG. 4 illustrates an exemplary webpage that includes embedded user interface elements in accordance with one or more embodiments described herein.

FIG. 4 illustrates an example webpage 400 that includes embedded user interface elements in accordance with one or more embodiments described herein. FIG. 4 provides an exemplary scenario to explain one or more technical details of this disclosure; however, other examples could be contemplated to explain the one or more technical details of this disclosure, and the one or more technical details of this disclosure is not limited to the example discussed in relation to FIG. 4.

FIG. 4 illustrates the user interface elements from FIG. 3 rendered together as a webpage 400, as would be displayed by device of a user accessing the webpage (e.g., such as computing device 100). Rendered embedded UI element 324 is shown occupying the blank space in rendered platform UI element 312. Embedded UI element 324 itself can include one or more embedded UI elements (e.g., sub-elements). In FIG. 4, rendered embedded UI element 324 includes payments list items 324A, which can be interacted with by a user (e.g., to manipulate or edit the data or data presentation). In FIG. 4, rendered embedded UI element 324 also includes navigation buttons 324B, which can be interacted with by a user (e.g., to navigate through the payments list). As can be seen in FIG. 4, the deployment of embedded UI element 324 within webpage 400 appears seamless.

Figure 5:
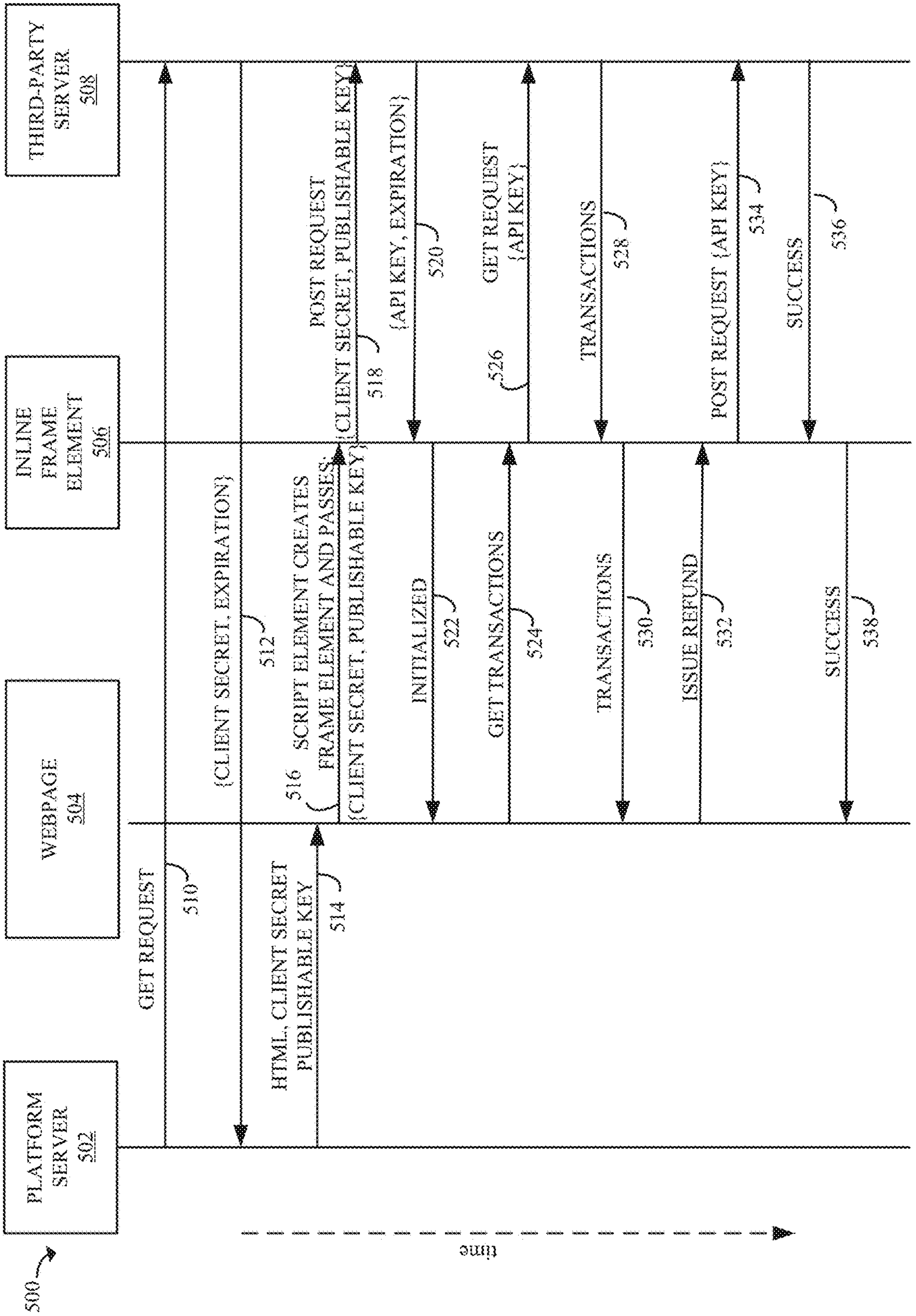
FIG. 5 illustrates a flow diagram for deploying embedded user interface elements in accordance with one or more embodiments described herein.

FIG. 5 illustrates an exemplary communications flow diagram 500 for deploying embedded user interface elements in accordance with one or more embodiments described herein. FIG. 5 provides an exemplary scenario to explain one or more technical details of this disclosure; however, other examples could be contemplated to explain the one or more technical details of this disclosure, and the one or more technical details of this disclosure is not limited to the example discussed in relation to FIG. 5.

Communications flow diagram 500 depicts server 502, webpage 504, inline frame element 506, and third-party server 508. Communications flow diagram 500 illustrates a set of communications between these listed components that ultimately result in a rendered version of a webpage that includes embedded UI elements in accordance with some embodiments. An example of a rendered version of the webpage is illustrated as webpage 400 in FIG. 4. Server 502 can include one or more features as described above with respect to any of computing device 100 and server 208. Webpage 504 can include one or more features as described above with respect to any of webpage 204, platform code 206, and script 210. While shown as a separate logical entity for communication purposes in FIG. 5, webpage 504 can exist on the device rendering webpage 504 (e.g., computing device 100 or user device 202). In some embodiments, webpage 504 includes script element 210. Inline frame element 506 can include one or more features as described above with respect to any of inline frame element 212 and inline frame element 330. While shown as a separate logical entity for communication purposes in FIG. 5, inline frame element 506 can exist on the device rendering webpage 504 (e.g., computing device 100 or user device 202). Server 508 can include one or more features as described above with respect to any of computing device 100 and third-party server 214. In some embodiments, the device rendering a webpage is different from the device displaying the webpage (e.g., the displaying device is a thin client).

At step 510, server 502 issues a GET request to server 508. Server 508 represents an interface (e.g., API) used to communicate with one or more systems of the third-party developer platform that develops and supports the embedded UI element architecture and ecosystem as described herein. At step 512, server 508 responds to server 502 with a client secret (e.g., a password, one or more characters, a hash, a token, and/or one or more encrypted values) and an associated expiration for the client secret. For example, this client secret can be used to authenticate a session with the inline frame element 506 that will proxy communication between webpage 504 and the server 508.

An example POST command issued by a trusted third-party entity via server 508 and received by an element of the webpage is included below, which includes a client secret.

```
POST /v1/delegation_intents \
-u sk_live_platformapikeyhere: \
-d account-acct_someaccountid
=>
{
  "client_secret": "some random string", "expires_at": 1234 # 60
  seconds in the
future
}
```

The service provider (e.g., server 502) takes the client secret returned in the result and passes it to its frontend (e.g., webpage 504) along with a publishable key. Both are embedded into the rendered HTML:

```
<html>
    <head>
            <script src="https://connect-
script.third_party_platform.com/v1/connect.js"></script>
    </head>
    <body>
            <!-- normal content here -->
            < third_party_platform -container publishable-
key="pk_live_apubkey" client-secret="some random string">
                    <h1>Normal html the platform adds in</h1>
                    <third_party_platform-transactions> </
third_party_platform -transactions>
            </ third_party_platform -container>
    </body>
</html>
```

At step 514, server 502 passes HTML components, the client secret, and the publishable key to webpage 504. For example, the HTML components can include references to platform UI elements (e.g., elements that are not embedded via the trusted third-party developer's ecosystem) as well as to a script element. In some embodiments, the script element causes the performance of processes established by the third-party developer of the embedded UI element and is necessary for rendering the embedded UI element. For example, the processes can include processes for loading embedded UI elements, for setting up a data layer between the embedded UI elements and an inline frame element, for creating appropriate permission/security context for the embedded UI elements, and/or for creating the inline frame element 506. At this point (step 514), the webpage 504 can be considered a blank page or at least an incomplete page because it does not have information for rendering embedded UI elements (e.g., called by a script element). At step 516, webpage 504 executes a script element, which creates inline frame element 506, and passes the client secret and the publishable key to the inline frame element 506.

In some embodiments, a script element includes one or more functional layers. As an example, there can be three functional layers that make up what is referred to as a "script element" as described herein. Each of these layers are built together and deployed by the service provider. In some embodiments, webpage script file is a script (e.g., JavaScript) file which is added to the webpage. In some embodiments, the script file executes in the webpage, and loads all embedded UI elements, handles setting up the data layer (e.g., between the webpage and the inline frame element), and creates appropriate permission and security context for the embedded UI elements. In some embodiments, this script file also inserts an inline frame element (e.g., an invisible <iframe>) into the webpage, which points to an HTML page (e.g., "script_element.html" described below). In some embodiments, this script file contains the platform context data layer, which packages up requests from embedded UI elements and sends them to the inline frame element, as well as handling responses and webpage observability. In some embodiments, script element HTML file (e.g., "script_element.html") is an HTML file. In some embodiments, it is served from the third-party developer platform (e.g., an associated third-party server 214, such as a server or CDN). In some embodiments, the role of this script element HTML file is to execute script content (e.g., described below) included in the script element HTML file, that makes up the trusted side of the data layer (e.g., between the webpage and the inline frame element). In some embodiments, script content in the script element HTML file is inside of the script element HTML file, script content (e.g., JavaScript) is executed, which handles setting up authentication, providing authentication to requests, and doing all communication through the inline frame element (e.g., iframe) to the third-party developer platform (e.g., using the third-party developer's API). In some embodiments, the script element includes an Authentication API. For example, this can be a public API method, "/v1/delegation_intent," which the webpage calls from server 502. This API method creates a request to start an embedded session for a given connected account (e.g., of the end user of the webpage 504). The server 502 receives a secret token that they pass off to the script element. In some embodiments, the script element passes this secret to the inline frame element 506 (e.g., iframe), which calls a private API method, /v1/delegation_intents/claim to consume that secret, and return an API key (e.g., also referred to as a merchant key or user key) which the inline frame element 506 then uses to authenticate requests made to the server 508.

In some embodiments, the script element of webpage 504 and/or inline frame element 506 form an API proxy. In some embodiments, when an embedded UI element (e.g., a transactions list element) needs to fetch data from the third-party developer platform, an API client is provided by the script element which transparently proxies the API request through the inline frame element 506 to the script inside of the inline frame element 506 (e.g., script content in the script element HTML file). The script inside of the inline frame element adds the authentication it has set up, and then calls the third-party provider's API endpoint (e.g., api.third-party-.com), which returns the result back through the inline frame element 506.

In some embodiments, permissions for accessing and/or modifying data is controlled by one or more of account policy and limitations imposed on or by a platform. For example, a user account (subaccount) logged in through a web browser that loads the service provider webpage can have a limited set of permissions. This set of permissions can be the intersection of what the webpage 504 (e.g., using the respective embedded UI element) is permitted to do and/or what the third-party developer platform permits the subaccount to do (e.g., using the respective embedded UI element). For example, the third-party developer platform can limit permissions for requests received via embedded UI elements so that the elements are only subject to a single authentication factor. In some embodiments, there is an upper bound for the number of embedded requests from a webpage platform. For example, permissions can thus be decided by the intersection:

<account permissions> & <service provider permissions> & embedded_upper_bound

In some embodiments, a single authentication factor is required for access by a subaccount. This allows some level of activity by the user via the embedded UI element. However, exposure of some functionality that might involve high risk for fraud or sensitive information (e.g., changing an external account, personal details, etc.), can require additional authentication factors. In some embodiments, a multi-factor authentication is required for access by a subaccount. Once additional required authentication factor is provided, the subaccount user can be granted additional permissions.

Turning back to FIG. 5, at step 518, the inline frame element 506 issues a POST request to server 508, the POST request including the client secret and the publishable key. At this stage, the inline frame element 506 is attempting to establish authentication with server 508, such that the inline frame element 506 can act as a trusted proxy between the webpage 504 and the server 508. At step 520, the server 508 issues a response that includes an API key (e.g., for signing communication between the inline frame element 506 using the server 508) and an associated expiration for the API key. At step 522, the inline frame element 506 is initialized (e.g., and informs one or more components of webpage 504). At this point, the inline frame element 506 can now request and receive data related to embedded UI elements via the server 508.

At step 524, the webpage 504 issues a request to the inline frame element 506 for transactions data associated with an embedded UI element (e.g., embedded UI element 324 in FIG. 4). At step 526, the inline frame element 506 (acting as a proxy) issues a GET request (including the API key) through the server 508. At step 528, the server 508 responds with transactions data to the inline frame element 506 as proxy, which is then passed to the webpage 504 at step 530. At this point, the webpage 504 can be considered loaded because the webpage 504 has received the appropriate data for rendering the embedded UI element for presenting transactions data.

Steps 532-538 illustrate an example series of communications for user interaction with the embedded UI element for presenting transactions data. At step 532, the webpage 504 issues a request to perform a refund of a particular transaction to the inline frame element 506. For example, the user of webpage 400 right clicked a transaction in list 424A and selected an option to "Refund Transaction." At step 534, the inline frame element 506 (acting as a proxy) issues a POST request (including the API key) through the server 508. At step 536, the server 508 responds with an indication that the refund has been successfully processed to the inline frame element 506 as proxy, which is then passed to the webpage 504 at step 538. This indication can include data that causes and/or allows the embedded UI element displayed within the webpage 504 to appear updated (e.g., a displayed transaction can be marked with a visible indicator "Refunded").

Figure 6:
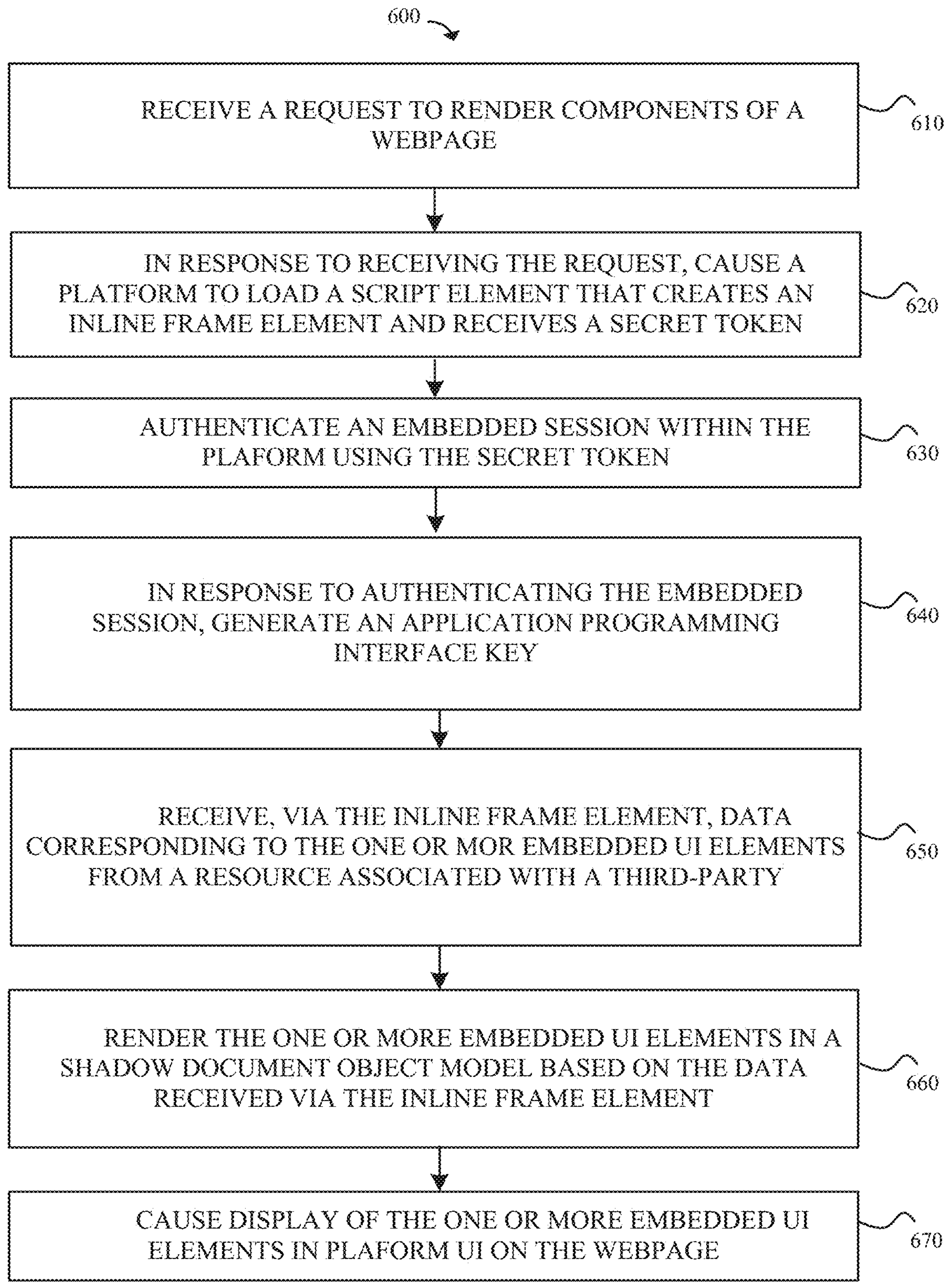
FIG. 6 illustrates a flow diagram illustrating a method for deploying embedded user interface elements in accordance with one or more embodiments described herein.

FIG. 6 is a flow diagram illustrating a method (e.g., method 600) for providing an application in accordance with one or more embodiments described herein. In some embodiments, method 600 is performed at a computer system (e.g., one or more servers, a smart phone, a desktop computer, and/or a tablet). In some embodiments, the computer system that performs the method 600 includes one or more components as described above, such as computing device 100.

At block 610, the computer system (e.g., 100, 208) receives a request to render components of a webpage (e.g., 400), wherein the webpage includes a platform (e.g., comprising platform code 206), a platform user interface (UI) (e.g., one or more platform UI element) (e.g., a user interface that includes one or more user interface elements (e.g., buttons, content, selectable objects, colors, and/or the like)), one or more embedded UI elements (e.g., 324), and an inline frame element (e.g., 606).

At block 620, in response to receiving the request, the computer system causes the platform to load a script element (e.g., 210) that creates the inline frame element and receives a secret token.

At block 630, the computer system authenticates an embedded session within the platform using the secret token.

At block 640, in response to authenticating the embedded session, the computer system generates an application programming interface (API) key, wherein the API key is used by the inline frame element to authenticate API requests to a resource associated with a third-party (e.g., 100, 214, 508). In some embodiments, the secret token is used to generate (e.g., receive, create, or otherwise obtain) the API key. In some embodiments, the secret token and/or the API key is encrypted.

At block 650, the computer system receives, via the inline frame element, data corresponding to the one or more embedded UI elements from the resource associated with a third-party (e.g., 214), wherein the inline frame element is a proxy between the platform and the resource associated with a third-party.

At block 660, the computer system renders the one or more embedded UI elements in a shadow document object model (DOM) based on the data corresponding to the one or more embedded UI elements received from the inline frame element, wherein the inline frame element does not render a UI. In some embodiments, the inline frame element does not cause any user interface elements to be rendered and displayed in the webpage. In some embodiments, use of the shadow DOM to render the embedded UI elements means that styles programmed by the payment processor that manages webpage 504 will not affect the appearance of the embedded UI elements rendered using the shadow DOM. In some embodiments, this can allow easier integration by a provider, because they do not need to worry about integrating and/or customizing formatting (and dealing with the errors that can result when accessed by differing hardware devices or under differing conditions).

At block 670, the computer system causes display (e.g., on a display of the computer system, or at a display of another device or system) of the one or more embedded UI elements in the platform UI on the webpage. For example, FIG. 4 illustrates an example webpage with a rendered and displayed embedded UI element 324 displayed in platform UI 312.

In some embodiments, the shadow DOM isolates (e.g., prohibits and/or protects) one or more style characteristics of the one or more embedded UI elements from being set by another DOM for the platform UI. For example, the DOM used to render platform UI elements is the other DOM.

In some embodiments, the one or more embedded UI elements are part of a plurality of embedded UI elements referenced in the script element. In some embodiments, each of the plurality of embedded UI elements are rendered using a respective shadow document object model (DOM) of a plurality of shadow DOMs (e.g., that are each defined in a markup language (e.g., HTML)). In some embodiments, the plurality of shadow DOMs isolates one or more style characteristics of their respective embedded UI elements from being set by one or more other DOMs that are used to style the platform UI. For example, different embedded UI elements (such as 424A and 424B) can each be associated with a separate shadow DOM.

In some embodiments, the computer system receives event data representing user interaction (e.g., edit or modification, addition, or deletion of data represented by the embedded UI element) with at least a portion of the one or more embedded UI elements. In some embodiments, in response to receiving the event data, the computer system issues an element interaction request to a third-party entity (e.g., third-party developer associated with server 508), via the inline frame element that is a proxy between the platform and the server, based on the event data. For example, the computer system receives input to refund a particular transaction represented by an embedded UI element that is displayed. In some embodiments, this request (e.g., to refund a particular transaction represented by an embedded UI) is relayed back to the third-party developer platform via the inline frame element as proxy.

In some embodiments, the computer system receives a response, from a resource (e.g., 214, 508) associated with the third-party entity via the inline frame element, to the element interaction request, wherein the response includes updated data corresponding to the portion of the one or more embedded UI elements. In some embodiments, the computer system causes an updated display of the webpage to include an updated representation of the portion of the one or more embedded UI elements that is generated based on the updated data corresponding to the portion of the one or more embedded UI elements. For example, the displayed webpage can include an updated embedded UI element that visually indicates that the selected transaction has been successfully refunded.

In some embodiments, the inline frame element is a headless iframe. A headless iframe is also referred to as an invisible iframe. In some embodiments, a headless iframe does not include user interface content that is rendered in a webpage.

Figure 7:
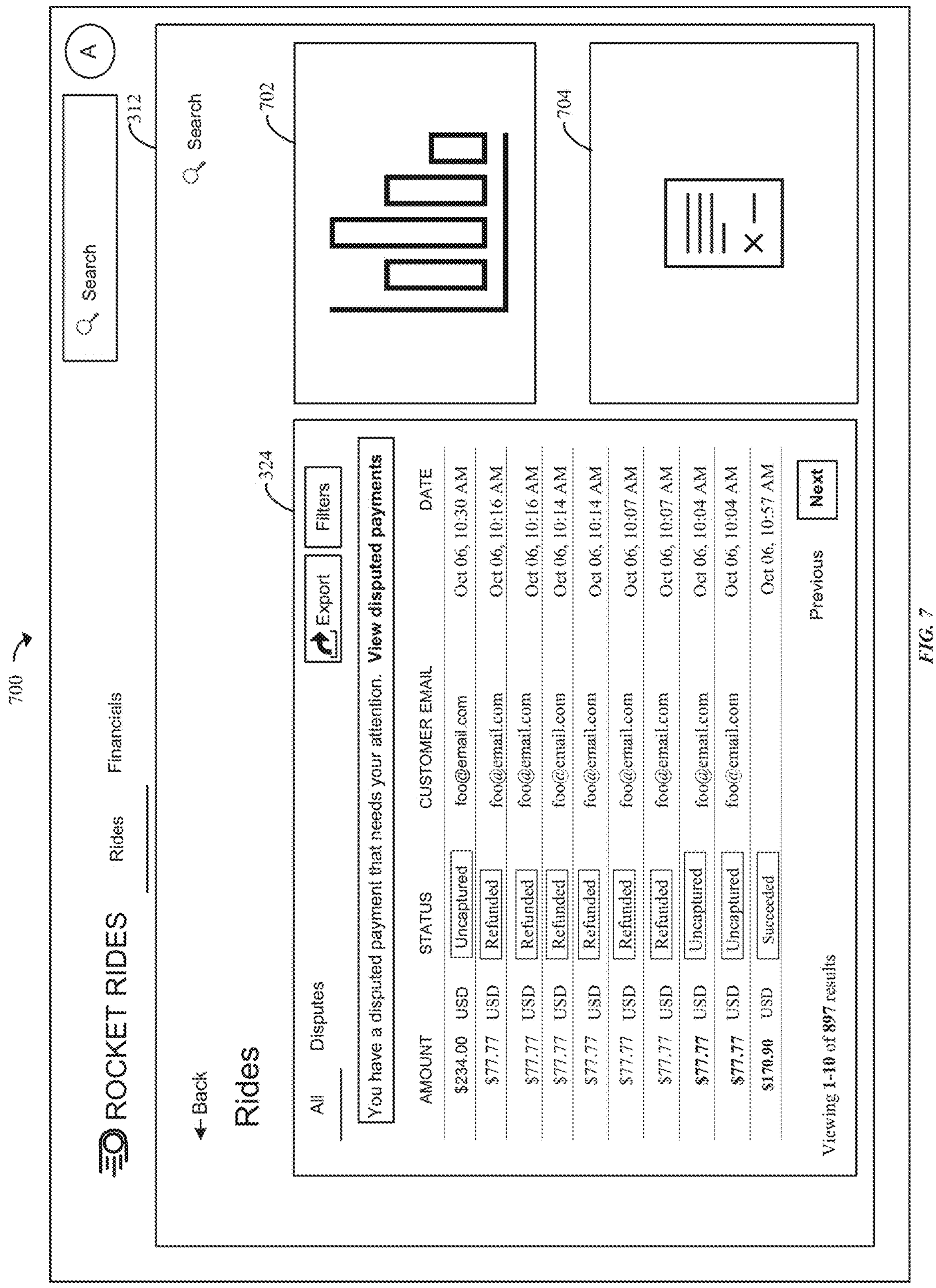
FIG. 7 illustrates an exemplary webpage that includes embedded user interface elements and embedded apps in accordance with one or more embodiments described herein.

FIG. 7 illustrates an example webpage 700 that includes embedded UI element 324 and embedded apps 702, 704 in accordance with one or more embodiments described herein. FIG. 7 provides an exemplary scenario to explain one or more technical details of this disclosure; however, other examples could be contemplated to explain the one or more technical details of this disclosure, and the one or more technical details of this disclosure are not limited to the example discussed in relation to FIG. 7.

FIG. 7 illustrates the user interface elements from FIG. 3 rendered together as a webpage 700, as would be displayed by the device of a user accessing the webpage 700 (e.g., such as computing device 100). Rendered embedded UI element 324 is shown occupying a portion of the blank space in rendered platform UI element 312. The blank space in rendered platform UI element 312 may also include embedded apps 702, 704.

The webpage 700 manager may be a merchant who partners with a payment processor to process payments, manage transactions, and/or the like. As described above with respect to FIG. 4, functionality that may be offered by the payment processor may be embedded directly into the webpage 700 as an embedded UI element 324 to provide the merchant and/or its customers a seamless experience without having to transition between the webpage 700 for functionality provided by the website and the payment processor's website for functionality provided by the payment processor. For example, embedded UI element 324 includes a list of payments from the payment processor, which a user (e.g., a merchant or merchant's customer) can interact with (e.g., to manipulate or edit the data or data presentation).

The merchant may integrate various apps (which may not be associated with the merchant or the payment processor) with their payment processor account so that apps developed by parties other than the payment processor can interact with the data of the merchant and/or merchant's customers stored in association with the payment processor. For example, the merchant may embed an analytics app and an invoicing app into the webpage 700 so that customers who use the webpage 700 can connect their payment processor account to the embedded analytics and invoicing apps to generate metrics and invoices, respectively, based on the list of payments associated with the customer's payment processor account.

Like the payment processor functionality (e.g., the list of payments), the integrated apps may also embed functionality into the webpage 700. Such apps can be seamlessly included within the user interface of the webpage 700. This allows the webpage 700 to offer native third-party integrations directly on their webpage 700, enhancing customer workflows by providing pre-built interfaces for integrating various tools and services, thus reducing the need for custom development and maintenance. For example, embedded app 702 may be a type of embedded UI element that provides functionality (e.g., code, images, etc.) from the analytics app to display metrics corresponding to one or more payments stored by the payment processor and displayed in embedded UI element 324; and embedded app 704 may be a type of embedded UI element that provides functionality from the invoicing app to generate invoices corresponding to one or more payments stored by the payment processor and displayed in embedded UI element 324.

Figure 8:
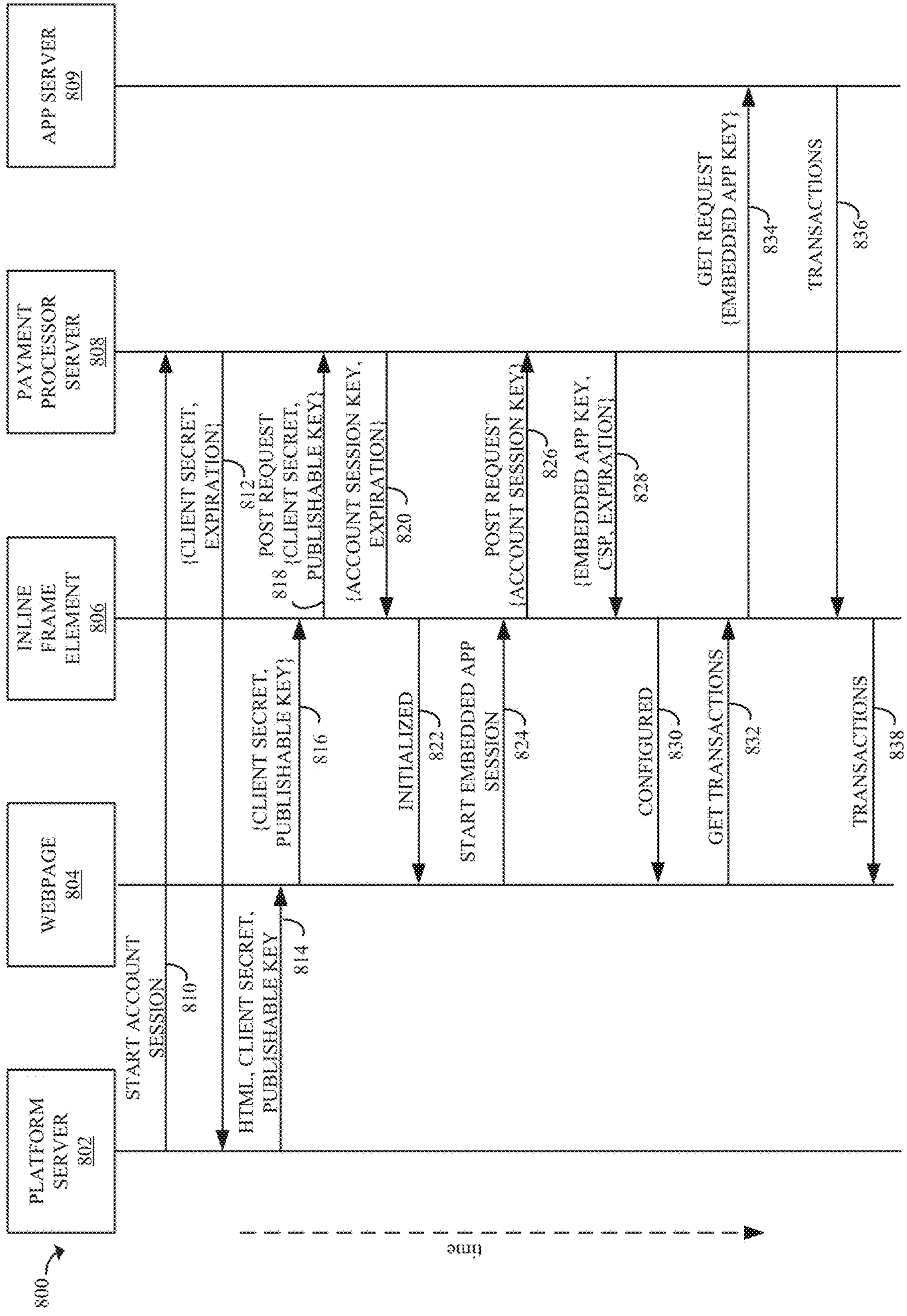
FIG. 8 illustrates a flow diagram for deploying embedded user interface elements for third-party applications in accordance with one or more embodiments described herein.

FIG. 8 illustrates an exemplary communications flow diagram 800 for deploying embedded UI elements for third-party applications in accordance with one or more embodiments described herein. FIG. 8 provides an exemplary scenario to explain one or more technical details of this disclosure; however, other examples could be contemplated to explain the one or more technical details of this disclosure, and the one or more technical details of this disclosure is not limited to the example discussed in relation to FIG. 8.

As described above with respect to FIG. 2, a merchant may operate a webpage 804 for use by a customer. The webpage 804 may include platform code (e.g., 206). The platform code (e.g., 206) can include embedded UI elements, which can add functionality to a webpage 804 or application, have a user interface appearance that is functionally independent of the user interface of the webpage 804, and be subject to authentication and permissions-based restrictions on access to merchant data hosted by a third-party entity, all while being visually integrated (also referred to herein as "embedded") into the webpage 804 (e.g., such that the embedded UI element shares one or more characteristics of the webpage into which the UI element is embedded). Embedded UI elements can include platform UI elements, which can be UI elements of the webpage (e.g., 204). Embedded UI elements can also include third-party UI elements, which can be UI elements developed by a third-party (e.g., a payment processor) and may be embedded via an encapsulation technique, described above with respect to FIG. 3.

In some embodiments, a customer's account on the payment processor server 808 may have one or more applications (also referred to as "apps") integrated (e.g., linked or installed to the customer's account) thereon (also referred to as "integrated apps") so that the one or more applications may access data associated with the customer's account. For example, the customer's account with the payment processor may have an integrated accounting app (e.g., an app developed by a party different than the payment processor) to track profits and losses associated with the customer's transactions stored on the payment processor server 808. The apps may be integrated to the customer's account with a set of permissions with respect to the customer's account, which the customer may approve at the time of integration. The app may also be embedded (e.g., visually integrated) into the platform webpage 804, where the customer may integrate the app with customer's payment processor account.

As such, an embedded app may utilize an embedded UI element developed by a third party (e.g., an app developer other than the payment processor) and may be embedded in a manner similar to the third-party UI elements. An embedded app may utilize code or instructions developed and/or stored in association with the other third party (e.g., the app developer) and/or integrated with the third party (e.g., the payment processor). Because an app integrated with the customer's account of the payment processor may have its own set of permissions with respect to the payment processor, apart from the permissions of the webpage 804 with respect to the payment processor, embodiments may include another process (e.g., 800) for authenticating and/or authorizing apps embedded in the webpage 804.

Extending from the approach described with respect to FIG. 5, the merchant can use embedded UI elements to develop a platform that provides a unified experience through which end users (e.g., customers) can utilize functionality from the merchant (e.g., natively on the webpage 804), the payment processor (e.g., via embedded UI elements), and one or more integrated apps (e.g., via embedded apps developed by parties other than the payment processor), in a manner that respects the permissions that the customer granted the app with respect to the customer's payment processor account, respects the permissions that the customer granted the platform with respect to the customer's payment processor account, promotes code reusability and simplifies the platform development processes.

Communications flow diagram 800 depicts platform server 802, webpage 804, inline frame element 806, payment processor server 808, and app server 809. Communications flow diagram 800 illustrates a set of communications between these listed components that ultimately result in a rendered version of a webpage that includes embedded UI elements for third-party applications in accordance with some embodiments. An example of a rendered version of the webpage is illustrated as webpage 700 in FIG. 7. Platform server 802 can include one or more features as described above with respect to any of computing device 100 and server 208. Webpage 804 can include one or more features as described above with respect to any of webpage 204, platform code 206, and script 210.

While shown as a separate logical entity for communication purposes in FIG. 8, webpage 804 can exist on the client device rendering webpage 804 (e.g., computing device 100 or user device 202). In some embodiments, webpage 804 includes script element 210. Inline frame element 806 can include one or more features as described above with respect to any of inline frame element 212 and inline frame element 330.

While shown as a separate logical entity for communication purposes in FIG. 8, inline frame element 806 can exist on the device rendering webpage 804 (e.g., computing device 100 or user device 202). The payment processor server 808 can include one or more features as described above with respect to any of computing device 100 and third-party server 214. The app server 809 can include one or more features as described above with respect to any of computing device 100 and third-party server 214. The payment processor server 808 and the app server 809 may be separate servers and/or operated by separate entities. In some embodiments, the device rendering a webpage is different from the device displaying the webpage (e.g., the displaying device is a thin client).

The platform server 802 may be a server that hosts the webpage 804 owned by a merchant. The payment processor server 808 may be a server that hosts a payment processing service used by the webpage 804 and/or is exposed to a customer via the webpage 804. The customer and/or merchant may each have an account with the payment processor (referred to herein as a "payment processor account") for managing aspects of the payment processing service (e.g., fund transfers). The payment processing service may have one or more embeddable UI elements so that actions that may ordinarily be performed on a webpage associated with the service may be performed on the webpage 804, which is under the control of the merchant. Although the payment processing service may be facilitated by the webpage 804, the payment processing service may be carried out by the payment processor server 808.

For example, embeddable UI elements may include a payments element for showing, on the webpage 804, a list of payments with export, refund, and dispute capabilities, where the list of payments is hosted on the payment processor server 808 and the export, refund, and dispute capabilities are carried out by the payment processor server 808. This way, the merchant can present a single interface to its customers that integrates the functionality of the webpage 804 with the functionality of the payment processor, which is embedded into the webpage 804.

The app server 809 may be a server that hosts one or more apps that can be integrated with an account of the payment processor for use with an account of the payment processor. The service may be such that developers, who may be unrelated to the payment processor, may develop apps built for integration/installation with accounts on the payment processor server 808, for example, to process, arrange, transform, or otherwise manipulate data from the payment processor. The merchant may specify one or more apps that may integrate (e.g., be installed) with the payment processor account of a customer (e.g., via the webpage 804). For example, the payment processor service may allow the webpage 804 to collect payments, and the merchant may embed an invoicing app on the webpage 804, which the customer may integrate with the customer's payment processor account to generate invoices for collected payments. Consequently, the customer may specify what permissions the integrated apps have with respect to the customer's payment processor account and data.

The integrated apps (e.g., apps installed in association with the customer's payment processor account and that add additional functionality to the customer's payment processor account) embedded on the webpage 804 (referred to herein as "embedded apps") allow customers of the merchant (e.g., users of the webpage 804) to interact with integrated apps directly or indirectly (e.g., via an inline frame element 806) on the webpage 804 alongside other functionality from native webpage 804 and other embedded UI elements. Because the customer can specify what apps may be integrated with the customer's payment processor account, what permissions the integrated apps may have, and/or the merchant can specify whether the integrated apps may be embedded, the payment processor server 808 may function as a middle layer between the platform server 802 and the app server 809 handling authentication and authorization so that the platform server 802 can securely access third-party apps from the app server 809.

At step 810, the platform server 802 calls an API of the payment processor server 808 to establish an account session. The API may be a public API "/v1/account_session". The account session corresponds to the customer's payment processor account. The account session allows the webpage 804 to have access to the customer's payment processor account in embedded apps. An account session may be created each time an embedded app may be displayed on the webpage 804. Account sessions may have a short lifespan and may not be reused.

At step 812, the payment processor server 808 responds to the platform server 802 with a client secret (e.g., a password, one or more characters, a hash, a token, and/or one or more encrypted values) and an associated expiration for the account session key. Within the account session, one or more embedded UI elements (e.g., embedded apps) may be enabled for rendering on the platform (e.g., webpage 804). For example, the customer may configure the customer's payment processor account to enable particular embedded UI elements, and the merchant may configure (e.g., code) the platform (e.g., webpage 804) to include one or more of the enabled embedded UI elements, which may then cause the enabled embedded UI elements included on the platform to be rendered.

The platform server 802 takes the client secret returned in the result and passes the client secret to the frontend (e.g., webpage 804). For example, the client secret may be embedded into the HTML components passed to a client device as the webpage 804 to be rendered on a web browser. The client secret of the account session may be used by the webpage 804 to establish secure access to the customer's payment processor account.

At step 814, platform server 802 passes HTML components and the client secret to the webpage 804. The HTML components can include references to platform UI elements (e.g., elements that are not embedded), embedded UI elements (e.g., components associated with the payment processor server 808), embedded apps (e.g., embedded UI elements of an app associated with the app server 809 and integrated with the payment processor), as well as to a script element. The script element may be used to render any included embedded UI elements, including embedded apps. For example, the script can include processes for loading embedded UI elements, for setting up a data layer between the embedded UI elements and an inline frame element, for creating appropriate permission/security context for the embedded UI elements, and/or for creating the inline frame element 806 associated with an embedded app. At this point (step 814), the webpage 804 can be considered a blank page or at least an incomplete page because it does not have information for rendering embedded apps (e.g., called by a script element).

At step 816, webpage 804 executes a script element, which creates inline frame elements (e.g., inline frame element 806) for the enabled embedded UI element and embedded app to be rendered on the webpage 804 and passes the client secret and the account session key to each created inline frame element. Without limiting the foregoing, only the inline frame element 806 associated with an embedded app is discussed with respect to FIG. 8, and the embedded app may be or may be part of an embedded UI element. The webpage 804 may include one or more embedded apps and/or one or more other embedded UI elements.

At step 818, when the inline frame element 806 is rendered for a particular embedded app, the inline frame element 806 calls a private API, such as "/v1/account_session/claim", which generates an account session key, which is associated with a set of permissions corresponding to each embedded component (e.g., embedded UI element and embedded app) and the permissions the webpage 804 has with respect to the customer's payment processor account.

Because the webpage 804 may have broad (e.g., full read/write) permissions with respect to the customer's payment processor account the permissions of the embedded app may be limited so as to be isolated from the permissions of other embedded apps and from the permissions of the account session, which may be rendering other components that are not embedded apps (e.g., embedded UI elements). In other words, the app that is being embedded is not given the broader permissions of the account session, and one embedded app's permissions should not be applied to other embedded apps operating in the same context. Instead, the embedded apps in the account session may have permission to create embedded app sessions and request embedded app keys. For example, the permissions include the permission for the embedded app to start an embedded app session with the payment processor server 808 to request the payment processor server 808 to generate an embedded app key for communicating (e.g., authenticating) with the payment processor server 808 and/or app server (e.g., app server 809) while an embedded UI element may have other permissions specified by the account session key. Starting a session with the payment processor server 808 and generating an app key is separate from starting an account session with the payment processor server 808 and generating an account session key associated with the payment processor server 808.

At step 820, the payment processor server 808 generates an account session key and issues a response that includes the account session key and an associated expiration for the account session key.

At step 822, the inline frame element 806 is initialized (e.g., and informs one or more components of webpage 804). The webpage 804 has established an account session with the payment processor server 808. However, with respect to the embedded apps, the account session key only provides the webpage 804 with the authorization to initialize the enabled embedded apps (e.g., apps integrated with the customer's payment processor account and enabled by the merchant for embedding), and the initialized inline frame element 806 still needs to obtain a separate key particular to the app's permissions with respect to the payment processor server 808 (e.g., to send and/or receive data with the payment processor server 808 and/or other servers). To do so, the script, at step 824, may direct the embedded app to establish an embedded app session with the payment processor server 808 (e.g., via the inline frame element 806) to get an embedded app key with permissions scoped to that particular app.

At step 826, the inline frame element 806 of the embedded app may generate a POST request to a private API of the payment processor server 808 to exchange the account session key for an embedded app key. The payment processor server 808 generates an embedded app key (the key for an embedded app) with permissions scoped to the embedded app. Accordingly, the embedded app key may have at least some of the permissions for the corresponding embedded app.

The embedded app may have a set of permissions tailored to its embedded state on the webpage 804. When the app is installed onto the customer's payment processor account, the app may be granted a particular set of permissions with respect to the customer's payment processor account. Problems may arise, however, when the app is embedded onto the webpage 804, as the webpage 804 may have more expansive permissions with respect to the payment processor account than the app. To tailor the embedded app's permissions, the permissions for the embedded app may be the intersection of the permissions of the embedded app and the permissions of the webpage 804 with respect to the customer's payment processor account, so that permissions for the embedded app are limited to the permissions that are common to both the app and the webpage 804. In other words, the permissions may be the intersection of the permissions on the connection between the app and the customer's payment processor account and the permissions on the connection between the webpage 804 and the customer's payment processor account. In some embodiments, the embedded app key may also or instead include permissions for the embedded app with respect to the app server 809. This way, the embedded app may receive a set of permissions tailored to it while maintaining isolation with the permissions of other embedded apps and the permissions of the account session, which may be used by other embedded UI elements that should have the same permissions as the webpage 804.

For example, assume the embedding webpage 804 has ["customer_write", "product_write", "transaction_write"] permissions on the connection between the webpage 804 and the payment processor account and the embedded app has ["customer_write", "invoice_write"] permissions on the connection between the app and the payment processor account. The embedded app key may be minted with permissions ["customer_write"]. If the embedded app via the inline frame element 806 makes a POST call to "/v1/customer" API, which requires the "customer_write" permission, the call will succeed. But if the embedded app via the inline frame element 806 makes a POST call to "/v1/product" API, which requires the "product_write" permission, the server will return a 403 response code indicating that it understands the request but refuses to authorize the request because the embedding webpage 804, and consequently the embedded app, does not have the "product_write" permission.

The payment processor server 808 may also dynamically configure the content security policy (CSP) of the inline frame element 806. A CSP is a security mechanism that can help safeguard the platform from potential vulnerabilities by enforcing secure content loading practices in the context of embedded apps. With CSP, the payment processor server 808 can specify which sources are allowed for various resources (e.g., scripts, stylesheets, images, and the like) within the inline frame element 806 to restrict the app to trusted sources, preventing the execution of unauthorized code, clickjacking, or other malicious behavior. CSP directives like "frame-ancestors" also allow the payment processor server 808 to restrict the embedding of the inline frame element 806 to specified trusted domains and/or enforce the same-origin policy so that the app is only accessible in its intended context (e.g., the webpage 804).

Hardcoding the CSP of an app to include the many possible domains and subdomains that may be permitted may be cumbersome and difficult to manage. Instead, the payment processor server 808 may dynamically generate a CSP for the inline frame element 806 of the embedded app. The CSP may be tailored to the app's requirements, the payment processor account's restrictions, and/or the context of the app embedded on the webpage 804.

For example, customers may ad hoc register their custom domains corresponding to the webpage 804 with their payment processor account. This registration process may empower the payment processor server 808 to maintain a dynamic mapping of webpages to their respective valid domains. When a webpage 804 embeds an app using the inline frame element 806, the payment processor server 808 may retrieve the associated allowed domains from the registered domain list of the customer's payment processor account, effectively enforcing a tailored security policy. As customers onboard with the platform server 802 and custom domains or subdomains emerge, the platform server 802 can seamlessly register the new domains with the payment processor server 808 so that the security configuration remains current and relevant.

At step 828, the payment processor server 808 may issue a response that includes the embedded app key and an associated expiration for the embedded app key. The response may also include the dynamic CSP. The CSP may be transmitted as a set of one or more directives and their associated values, which may be included in the header of the HTTP response.

At step 830, the inline frame element 806 may receive the response from the payment processor server 808, including the embedded app key and CSP. The CSP may be provided to the webpage 804 for the browser to enforce. The embedded app may at this point be considered properly configured to operate within the webpage 804. API calls made by the inline frame element 806 for the embedded app may be made using the embed app key, and the embedded app may use the embedded app key to proxy communications between the webpage 804 and a third party such as the payment processor server 808 and/or the app server 809. Additionally or alternatively, the embedded app may communicated directly with a third party, such as the payment processor server 808 and/or the app server 809, using the embedded app key to authenticate with the third party.

For example, at step 832, the webpage 804 issues a request to the inline frame element 806 for transactions data associated with an embedded app. At step 834, the inline frame element 806 (acting as a proxy) issues a GET request (including the embedded app key) to the app server 809. At step 836, the app server 809 responds with transactions data to the inline frame element 806 as proxy, which is then passed to the webpage 804 at step 838. At this point, the webpage 804 can be considered loaded because the webpage 804 has received the appropriate data for rendering the embedded app for presenting transactions data.

Figure 9:
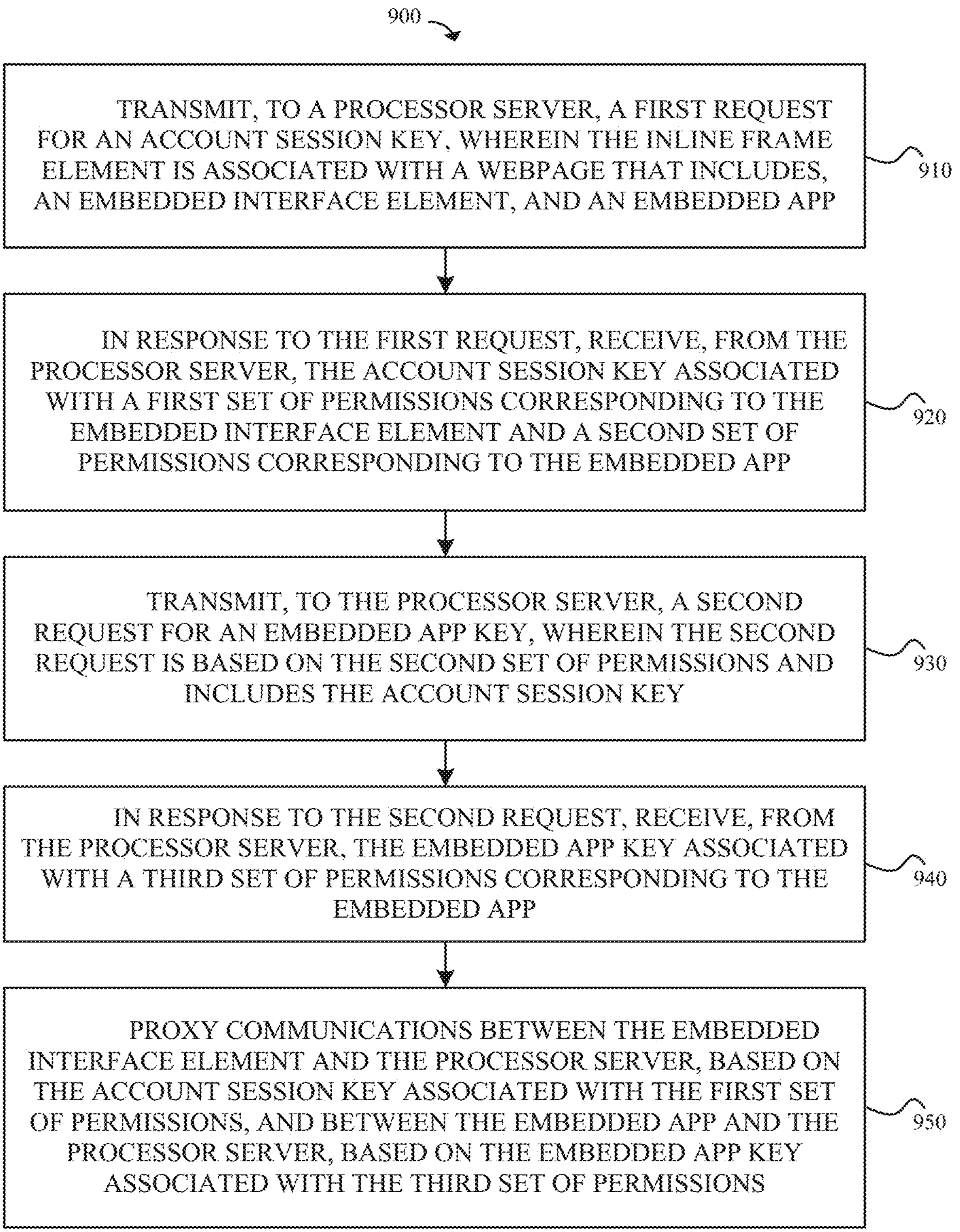
FIG. 9 is a flow diagram illustrating a method for deploying an embedded application in accordance with one or more embodiments described herein.

FIG. 9 is a flow diagram illustrating a method (e.g., method 900) for providing an embedded application (also referred to as an "embedded app") in accordance with one or more embodiments described herein. Method 900 will be described with respect to the components of FIG. 8.

At block 910, the inline frame element 806 may transmit to the payment processor server 808 a request for an account session key. The inline frame element 806 may be part of the webpage 804, which may include one or more embedded UI elements (e.g., to provide functionality associated with the payment processor server 808) and/or one or more embedded apps (e.g., to provide functionality associated with the app server 809 and/or the payment processor server 808). The inline frame element 806 may be a hidden element in a DOM of the webpage 804.

At block 920, in response to the request of block 910, the inline frame element 806 may receive from the payment processor server 808, the account session key. The payment processor server 808 may authenticate the request to determine that it comes from a customer associated with a payment processor account. The payment processor server 808 may also determine permissions that the webpage 804 has with respect to the customer's payment processor account, permissions that the embedded UI elements have with respect to the customer's payment processor account, and/or permissions that the embedded apps have to obtain their respective embedded app keys. Upon authenticating the customer, the payment processor server 808 may generate an account session key associated with the determined permissions and send the account session key as a response to the request.

At block 930, the inline frame element 806 may transmit to the payment processor server 808 a request for an embedded app key. Because an embedded app is integrated with the customer's payment processor account with its own set of permissions with respect to the customer's payment processor account, the embedded app may obtain an embedded app key associated with its permissions so as to maintain isolation from the permissions associated with the account session key and/or other embedded apps. The inline frame element 806 may transmit the request for an embedded app key for a particular embedded app if the embedded app has permission to request an embedded app key based on the account session key. In some implementations, the request may include the account session key.

The inline frame element 806 may also or instead transmit a request for an additional authentication key to the app server 809. In such case, the additional authentication key may also or instead be associated with permissions with respect to the app server 809 to access resources beyond the payment processor server 808 (e.g., steps 834-836). In some implementations, the embedded app key and the additional authentication key may be the same key.

At block 940, in response to the request of block 930, the inline frame element 806 may receive from the embedded app key for an embedded app. In some embodiments, the inline frame element 806 may also receive a CSP for an embedded app. The CSP of the embedded app may be updated according to the received CSP so that the embedded app is only rendered by authorized webpages (e.g., webpage 804) and so that the embedded app can only render resources from authorized sources (e.g., payment processor server 808 and/or app server 809).

At block 950, the inline frame element 806 may proxy communications between the embedded UI element and the payment processor server 808, which may be based on the set of permissions associated with the account session key. The inline frame element 806 may also proxy communications between the embedded app and the payment processor server 808 and/or the app server 809, which may be based on the set of permissions associated with the embedded app key.

The webpage 804 may render the embedded app in a shadow DOM based on the data corresponding to the embedded app received from the inline frame element 806, wherein the inline frame element 806 does not render a UI. In some embodiments, use of the shadow DOM to render the embedded UI elements, including the embedded app, means that styles programmed by the merchant that manages webpage 804 will not affect the appearance of the embedded UI elements rendered using the shadow DOM. In some embodiments, this can allow easier integration by a merchant, because they do not need to worry about integrating and/or customizing formatting (and dealing with the errors that can result when accessed by differing hardware devices or under differing conditions).

For example, FIG. 7 illustrates an example webpage 700 with a rendered and displayed embedded UI element 324 displayed in platform UI element 312, and the embedded UI element 324 may be associated with the payment processor (e.g., payment processor server 808) and accesses data from the payment processor server 808. In that example, the transactions displayed in the embedded UI element 324 may also be displayed with, for example, charts representing profits and losses over time based on the customer's payment processor account integration with an accounting tool associated with an app server (e.g., app server 809). The accounting tool may be an embedded app 702 integrated with the payment processor account and thus can access the customer's transactions to generate one or more charts based on the customer's transactions.

In some embodiments, the shadow DOM isolates (e.g., prohibits and/or protects) one or more style characteristics of the embedded app from being set by another DOM for the platform UI. For example, the DOM used to render platform UI elements is the other DOM.

In some embodiments, the embedded app is a part of a plurality of embedded apps referenced in the script element. In some embodiments, the embedded app is rendered using a respective shadow DOM of a plurality of shadow DOMs (e.g., that are each defined in a markup language (e.g., HTML)). In some embodiments, the plurality of shadow DOMs isolates one or more style characteristics of their respective embedded app from being set by one or more other DOMs that are used to style the platform UI. For example, different apps can each be associated with a separate shadow DOM.

In some embodiments, the computer system receives event data representing user interactions (e.g., edit or modification, addition, or deletion of data represented by the embedded app) with at least a portion of the embedded app. In some embodiments, in response to receiving the event data, the computer system issues an element interaction request to a third-party entity (e.g., app server 809), via the inline frame element 806 that is a proxy between the platform and the server, based on the event data. For example, if the embedded app is an accounting app that is integrated with the customer's payment processor account and can view the customer's transactions, the computer system receives input to view a graphical breakdown of profits based on the customer's transactions (e.g., shown in list 424A). In some embodiments, this request (e.g., to view a breakdown of profits represented by an embedded app) is relayed back to the third-party developer platform via the inline frame element 806 as proxy.

In some embodiments, the computer system receives a response, from a resource (e.g., 214, 810) associated with the third-party entity via the inline frame element 806, to the element interaction request, wherein the response includes updated data corresponding to the portion of the embedded app. In some embodiments, the computer system causes an updated display of the webpage to include an updated representation of the portion of the embedded app that is generated based on the updated data corresponding to the portion of the embedded app. For example, the displayed webpage can include an updated embedded app that visually indicates a breakdown of profits based on the customer's transactions (e.g., transactions shown in list 424A).

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described to best explain the principles and practical applications of the various embodiments, to thereby enable others skilled in the art to best utilize the various embodiments with various modifications as may be suited to the particular use contemplated.

What is claimed is:

1. A method comprising:

transmitting, by an inline frame element and to a processor server, a first request for an account session key, wherein the inline frame element is associated with a webpage that includes an embedded interface element and an embedded app;

in response to transmitting the first request for the account session key, receiving, by the inline frame element and from the processor server, the account session key associated with a first set of permissions corresponding to the embedded interface element and a second set of permissions corresponding to the embedded app;

transmitting, by the inline frame element and to the processor server, a second request for an embedded app key, wherein the second request is based on the second set of permissions and includes the account session key;

in response to transmitting the second request for the embedded app key, receiving, by the inline frame element and from the processor server, the embedded app key associated with a third set of permissions corresponding to the embedded app; and proxying, by the inline frame element, communications between the embedded interface element and the processor server, based on the account session key associated with the first set of permissions, and between the embedded app and the processor server, based on the embedded app key associated with the third set of permissions.

2. The method of claim 1, wherein the inline frame element is not visible.

3. The method of claim 1, wherein the embedded interface element is rendered in a first shadow document object model (DOM) and the embedded app is rendered in a second shadow DOM, and wherein the first and second shadow DOMs isolate one or more style characteristics of the embedded interface element and the embedded app from being set by one or more other document object models that are used to style the webpage.

4. The method of claim 1, further comprising:

in response to transmitting the second request for the embedded app key, receiving, by the inline frame element and from the processor server, an updated content security policy; and updating a content security policy of the inline frame element based on the updated content security policy.

5. The method of claim 1, wherein the embedded app is associated with at least one of the processor server and an app server, and the inline frame element proxies communications between the embedded app and at least one of the processor server and the app server based on the embedded app key associated with the third set of permissions.

6. The method of claim 1, further comprising:

in response to a user interaction with at least a portion of the embedded app, issuing, by the inline frame element as a proxy of the embedded app, an element interaction request to the processor server based on the user interaction.

7. The method of claim 6, further comprising:

in response to issuing the element interaction request to the processor server, receiving, by the inline frame element, a response including updated data corresponding to the portion of the embedded app; and causing an updated display of the webpage to include an updated representation of the portion of the embedded app that is generated based on the updated data corresponding to the portion of the embedded app.

8. An electronic device comprising:

a memory; and a processor circuit configured to:

transmit, by an inline frame element and to a processor server, a first request for an account session key, wherein the inline frame element is associated with a webpage that includes an embedded interface element and an embedded app;

in response to transmitting the first request for the account session key, receive, by the inline frame element and from the processor server, the account session key associated with a first set of permissions corresponding to the embedded interface element and a second set of permissions corresponding to the embedded app;

transmit, by the inline frame element and to the processor server, a second request for an embedded app key, wherein the second request is based on the second set of permissions and includes the account session key;

in response to transmitting the second request for the embedded app key, receive, by the inline frame element and from the processor server, the embedded app key associated with a third set of permissions corresponding to the embedded app; and proxy, by the inline frame element, communications between the embedded interface element and the processor server, based on the account session key associated with the first set of permissions, and between the embedded app and the processor server, based on the embedded app key associated with the third set of permissions.

9. The electronic device of claim 8, wherein the inline frame element is not visible.

10. The electronic device of claim 8, wherein the embedded interface element is rendered in a first shadow document object model (DOM) and the embedded app is rendered in a second shadow DOM, and wherein the first and second shadow DOMs isolate one or more style characteristics of the embedded interface element and the embedded app from being set by one or more other document object models that are used to style the webpage.

11. The electronic device of claim 8, wherein the processor circuit is further configured to:

in response to transmitting the second request for the embedded app key, receive, by the inline frame element and from the processor server, an updated content security policy; and update a content security policy of the inline frame element based on the updated content security policy.

12. The electronic device of claim 8, wherein the embedded app is associated with at least one of the processor server and an app server, and wherein the processor circuit is further configured to cause the inline frame element to proxy communications between the embedded app and at least one of the processor server and the app server based on the embedded app key associated with the third set of permissions.

13. The electronic device of claim 8, wherein the processor circuit is further configured to:

in response to a user interaction with at least a portion of the embedded app, issue, by the inline frame element as a proxy of the embedded app, an element interaction request to the processor server based on the user interaction.

14. The electronic device of claim 13, wherein the processor circuit is further configured to:

in response to issuing the element interaction request to the processor server, receive, by the inline frame element, a response including updated data corresponding to the portion of the embedded app; and cause an updated display of the webpage to include an updated representation of the portion of the embedded app that is generated based on the updated data corresponding to the portion of the embedded app.

15. A non-transitory computer-readable medium storing instructions that, when executed by a processor, cause the processor to perform operations comprising:

transmitting, by an inline frame element and to a processor server, a first request for an account session key, wherein the inline frame element is associated with a webpage that includes an embedded interface element and an embedded app;

in response to transmitting the first request for the account session key, receiving, by the inline frame element and from the processor server, the account session key associated with a first set of permissions corresponding to the embedded interface element and a second set of permissions corresponding to the embedded app;

transmitting, by the inline frame element and to the processor server, a second request for an embedded app key, wherein the second request is based on the second set of permissions and includes the account session key;

in response to transmitting the second request for the embedded app key, receiving, by the inline frame element and from the processor server, the embedded app key associated with a third set of permissions corresponding to the embedded app; and proxying, by the inline frame element, communications between the embedded interface element and the processor server, based on the account session key associated with the first set of permissions, and between the embedded app and the processor server, based on the embedded app key associated with the third set of permissions.

16. The non-transitory computer-readable medium of claim 15, wherein the inline frame element is not visible.

17. The non-transitory computer-readable medium of claim 15, wherein the embedded interface element is rendered in a first shadow document object model (DOM) and the embedded app is rendered in a second shadow DOM, and wherein the first and second shadow DOMs isolate one or more style characteristics of the embedded interface element and the embedded app from being set by one or more other document object models that are used to style the webpage.

18. The non-transitory computer-readable medium of claim 15, wherein the operations further comprise:

in response to transmitting the second request for the embedded app key, receiving, by the inline frame element and from the processor server, an updated content security policy; and updating a content security policy of the inline frame element based on the updated content security policy.

19. The non-transitory computer-readable medium of claim 15, wherein the embedded app is associated with at least one of the processor server and an app server, and wherein the operations further comprise: proxying, by the inline frame element, communications between the embedded app and at least one of the processor server and the app server based on the embedded app key associated with the third set of permissions.

20. The non-transitory computer-readable medium of claim 15, wherein the operations further comprise:

in response to a user interaction with at least a portion of the embedded app, issuing, by the inline frame element as a proxy of the embedded app, an element interaction request to the processor server based on the user interaction.

* * * * *